United States Patent
Kitou et al.

(10) Patent No.: US 12,018,673 B2
(45) Date of Patent: Jun. 25, 2024

(54) COMPRESSOR CONTROL METHOD

(71) Applicant: DAIKIN INDUSTRIES, LTD., Osaka (JP)

(72) Inventors: Minoru Kitou, Osaka (JP); Hitoshi Ozawa, Osaka (JP); Masahide Higuchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 170 days.

(21) Appl. No.: 17/758,031

(22) PCT Filed: Dec. 25, 2020

(86) PCT No.: PCT/JP2020/048850
§ 371 (c)(1),
(2) Date: Jun. 27, 2022

(87) PCT Pub. No.: WO2021/132606
PCT Pub. Date: Jul. 1, 2021

(65) Prior Publication Data
US 2023/0036994 A1     Feb. 2, 2023

(30) Foreign Application Priority Data

Dec. 27, 2019 (JP) .................. 2019-238422

(51) Int. Cl.
*F04B 49/06* (2006.01)
*F04B 35/04* (2006.01)
*F04B 39/00* (2006.01)

(52) U.S. Cl.
CPC ............ *F04B 49/065* (2013.01); *F04B 35/04* (2013.01); *F04B 39/0027* (2013.01); *F04B 2203/0207* (2013.01); *F04B 2203/0209* (2013.01)

(58) Field of Classification Search
CPC .... F04B 49/065; F04B 35/04; F04B 39/0027; F04B 2203/0207; F04B 2203/0209
See application file for complete search history.

(56) References Cited

U.S. PATENT DOCUMENTS

2003/0223816 A1* 12/2003 Potts .................. E01C 19/288
404/117
2018/0309398 A1 10/2018 Kitou et al.

FOREIGN PATENT DOCUMENTS

| DE | 102008038661 | 2/2010 |
| JP | H02-164298 | 6/1990 |
| JP | 2552562 | 11/1996 |

(Continued)

OTHER PUBLICATIONS

English Translation of JP-2003004352-A obtained Feb. 7, 2024 (Year: 2003).*

(Continued)

*Primary Examiner* — Connor J Tremarche
(74) *Attorney, Agent, or Firm* — IPUSA, PLLC

(57) ABSTRACT

A compressor control method of controlling the vibration amplitude of a compressor equipped with a motor by using the motor is provided. The compressor is driven by the motor, and this method includes controlling, in a specific operating area, the vibration amplitude of the compressor such that the vibration amplitude is substantially constant regardless of changes in the load imposed on the motor and in the number of revolutions of the motor per unit time.

5 Claims, 16 Drawing Sheets

(56) References Cited

FOREIGN PATENT DOCUMENTS

| | | |
|---|---|---|
| JP | 2002-039075 | 2/2002 |
| JP | 2003-004352 | 1/2003 |
| JP | 2003004352 A * | 1/2003 |
| JP | 3874865 | 1/2007 |
| JP | 4596906 | 12/2010 |
| JP | 6103125 | 3/2017 |
| JP | 2017-209012 | 11/2017 |
| JP | 6364463 | 7/2018 |
| JP | 2019-207071 | 12/2019 |
| KR | 20030090053 | 11/2003 |

OTHER PUBLICATIONS

International Search Report for PCT/JP2020/048850 mailed on Mar. 2, 2021.
International Preliminary Report on Patentability for PCT/JP2020/048850 mailed on Jul. 7, 2022.
Extended European Search Report mailed on Dec. 13, 2023 with respect to the corresponding European patent application No. 20908329.4.

* cited by examiner

FIG.5
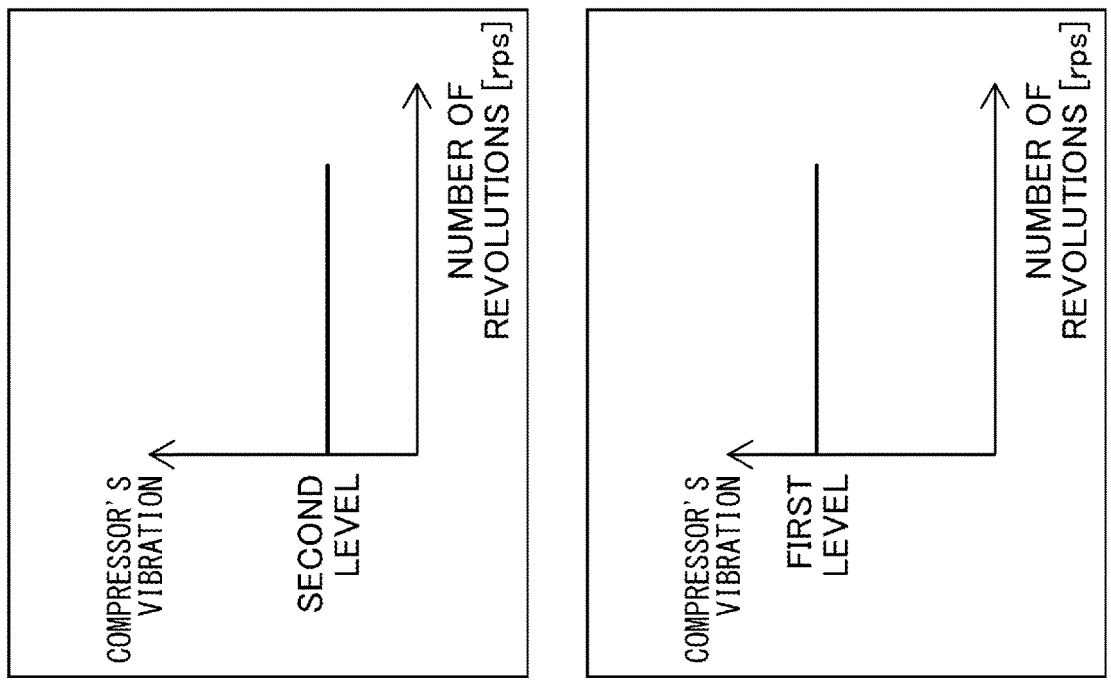
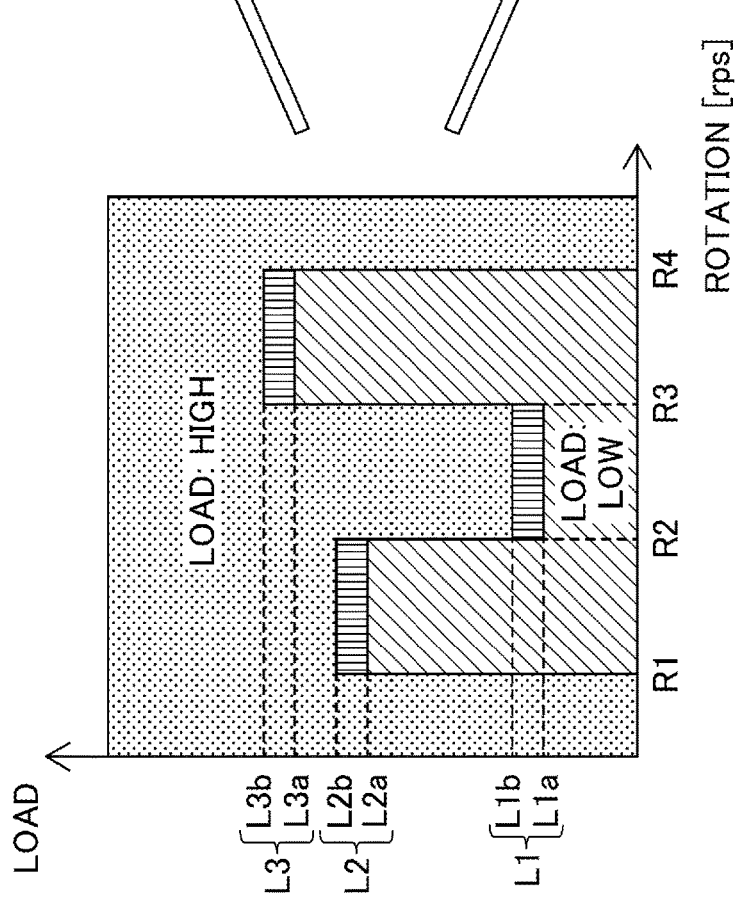

FIG.6
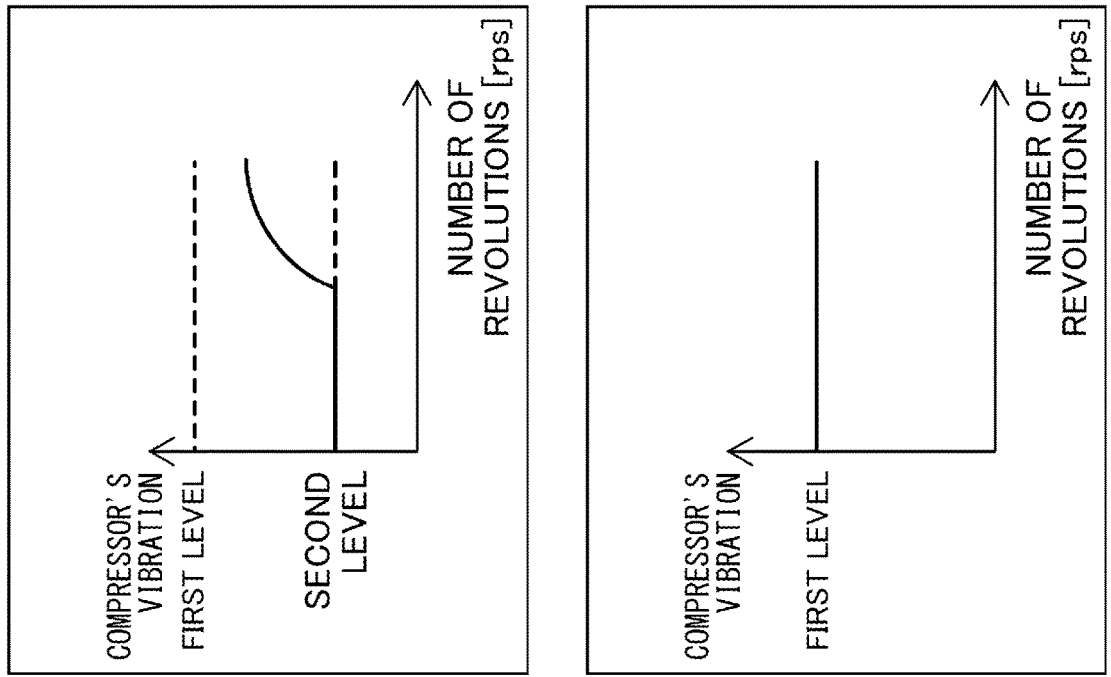
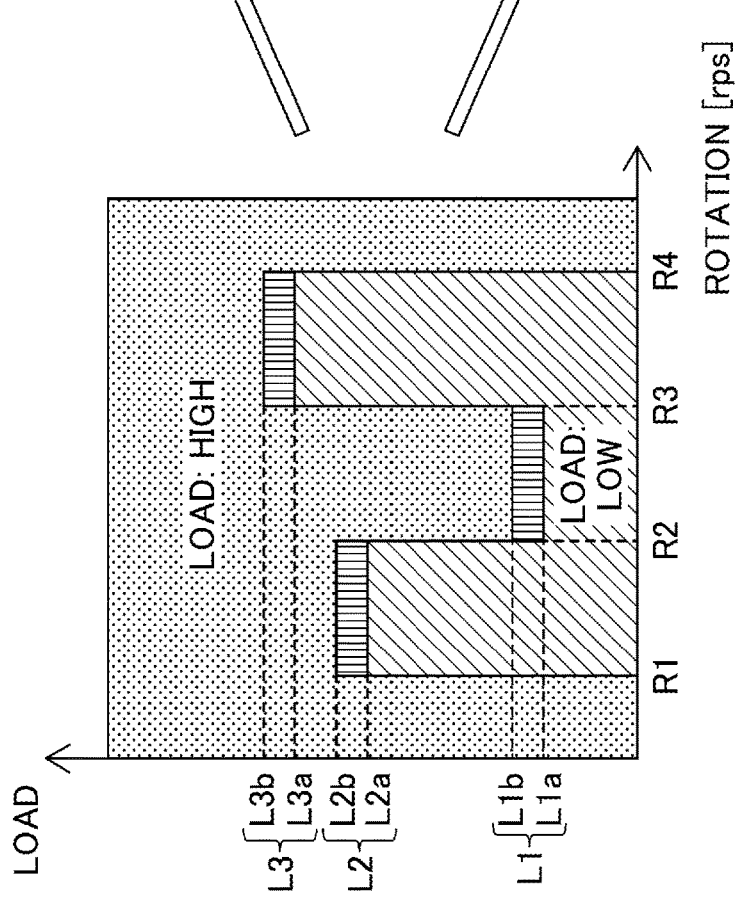

COMPRESSOR CONTROL METHOD

TECHNICAL FIELD

This disclosure relates to a compressor control method.

BACKGROUND ART

An art to reduce the vibration of a compressor is known (see, for example, Patent Document 1).

RELATED-ART DOCUMENT

Patent Document

[Patent Document 1] Japanese Patent No. 6103125

SUMMARY

Problems to be Solved by the Invention

The present disclosure proposes a compressor control method that can reduce the vibration of a compressor in a specific operating area.

Means to Solve the Problem

A first aspect of the present disclosure provides a compressor control method of controlling the vibration amplitude of a compressor equipped with a motor by using the motor. In this compressor control method, the compressor is driven by the motor, and the method includes controlling, in a specific operating area, the vibration amplitude such that the vibration amplitude is substantially constant regardless of changes in the load imposed on the motor and in the number of revolutions of the motor per unit time.

According to the compressor control method of the first aspect, in a specific operating area, the vibration amplitude is controlled to be substantially constant regardless of the changes of the load that is imposed on the motor and the number of revolutions of the motor per unit time, so that the compressor's vibration can be reduced.

In view of the above first aspect, the compressor control method according to a second aspect of the present disclosure includes controlling the vibration amplitude based on data read from a preconfigured table such that the vibration amplitude is substantially constant regardless of the changes.

According to the compressor control method of the second aspect, the vibration amplitude is controlled to be substantially constant based on data that is read from a reconfigured table, regardless of the above changes, so that the compressor's vibration can be reduced.

In view of the above second aspect, the compressor control method according to a third aspect of the present disclosure includes:

controlling the vibration amplitude such that the vibration amplitude is set to a first level when the load imposed on the motor drops to or below a first threshold that is set for every number of revolutions of the motor per unit time; and controlling the vibration amplitude such that the vibration amplitude is set to a second level when the load imposed on the motor rises above a second threshold that is set for every number of revolutions of the motor per unit time, the first threshold being lower than or equal to the second threshold, and the second level being lower than the first level.

The more the load on the motor increase, the more the vibration amplitude of the compressor tends to increase. According to the compressor control method of the third aspect, when the load that is imposed on the motor rises above the second threshold, the vibration amplitude of the compressor can be controlled to the second level, which is lower than the first level, so that the compressor's vibration amplitude can be reduced.

In view of the above third aspect, the compressor control method according to a fourth aspect of the present disclosure has a mode, in which the vibration amplitude of the compressor is controlled between the first level and the second level.

According to the compressor control method of the fourth aspect, the vibration amplitude of the compressor is controlled between the first level and the second level even when the vibration amplitude of the compressor cannot be controlled to the second level for some reason, so that the vibration of the compressor can be reduced.

In view of one of the above first aspect to the fourth aspect, the compressor control method according to a fifth aspect of the present disclosure includes controlling the vibration amplitude such that the vibration amplitude is set to be substantially constant based on a variable that increases or decreases according to the vibration amplitude, regardless of the above changes.

According to the compressor control method of the fifth aspect, the vibration amplitude of the compressor is controlled to be substantially constant based on a variable that increases or decreases according to the vibration amplitude, regardless of the above changes, so that the increase of the compressor's vibration amplitude can be reduced.

In view of the above fifth aspect, the compressor control method according to a sixth aspect of the present disclosure includes:

controlling the vibration amplitude such that the vibration amplitude is set to the first level when the load imposed on the motor drops to or below a first threshold that is set for every number of revolutions of the motor per unit time; and controlling the vibration amplitude such that the vibration amplitude is set to the second level when the load imposed on the motor rises above a second threshold that is set for every number of revolutions of the motor per unit time, the first threshold being lower than or equal to the second threshold, and the second level being lower than the first level.

The more the load on the motor increase, the more the vibration amplitude of the compressor tends to increase. According to the compressor control method of the sixth aspect, when the load that is imposed on the motor rises above the second threshold, the vibration amplitude of the compressor is controlled to the second level, which is lower than the first level, so that the increase of the compressor's vibration amplitude can be reduced.

In view of one of the above sixth aspect, the compressor control method according to a seventh aspect of the present disclosure has a mode in which the vibration amplitude of the compressor is controlled between the first level and the second level.

According to the compressor control method of the seventh aspect, the vibration amplitude of the compressor is controlled between the first level and the second level even when the vibration amplitude of the compressor cannot be controlled to the second level for some reason, so that the vibration of the compressor can be reduced.

In view of one of the above fifth aspect to the seventh aspect, in the compressor control method according to an eighth aspect of the present disclosure:
the variable is one of
a vibration-inducing torque, generated by the difference between load torque that is imposed on the motor and motor torque that is generated by the motor,
the magnitude of variation of the magnetic pole positions of the motor, and
the magnitude of variation of the rotation speed of the motor,
the magnitude of the vibration-inducing torque, the magnitude of variation of the magnetic pole positions, or the magnitude of variation in the rotation speed changing according to the number of revolutions of the motor per unit time.

According to the compressor control method of the eighth aspect of the present disclosure, as the variable is one of a vibration-inducing torque, the magnitude of variation of magnetic pole positions, or the magnitude of variation of rotation speed, and these change according to the number of revolutions of the motor per unit time, so that the compressor's vibration can be reduced.

BRIEF DESCRIPTION OF DRAWINGS

FIG. 5 is a diagram for explaining a compressor control method according to a second embodiment;

FIG. 6 is a diagram for explaining a compressor control method according to a third embodiment;

MODE FOR CARRYING OUT THE INVENTION

Now, embodiments will be described.

Figure 1:
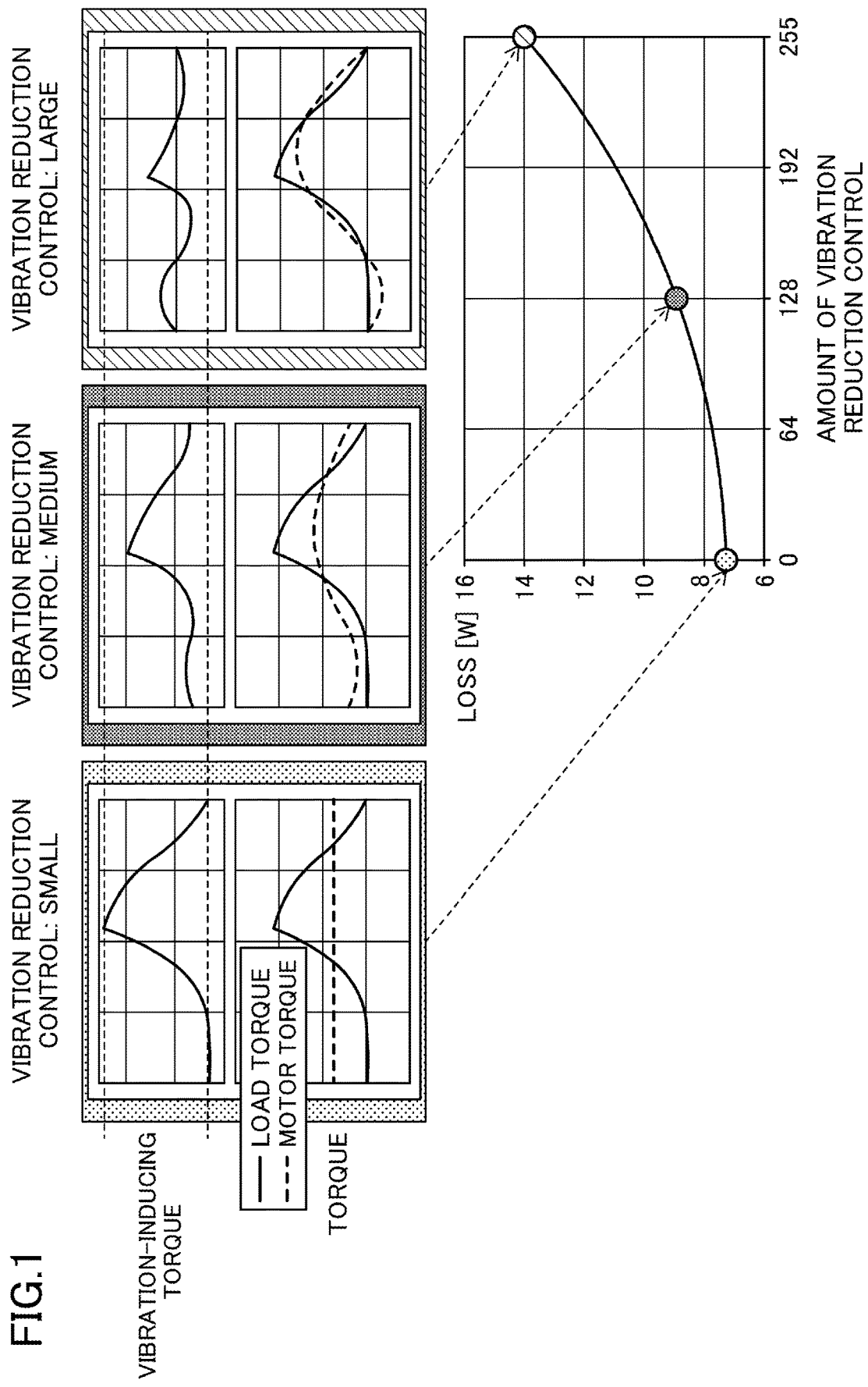
FIG. 1 is a diagram for explaining control (vibration reduction control) for reducing the vibration of a compressor.

FIG. 1 is a diagram for explaining control (vibration reduction control) for reducing the vibration of a compressor. A compressor is a device that compresses a refrigerant. A compressor is driven by a motor and is used, for example, in an air conditioner. During the process of compressing the refrigerant, the load that is imposed on the compressor's motor (for example, load torque) varies significantly as illustrated in FIG. 1. Vibration-inducing torque refers to the torque that is generated by the difference between the torque output by the motor (motor torque) and the load torque imposed upon the motor. This vibration-inducing torque causes the compressor to vibrate.

Vibration reduction control changes the controllable motor torque to follow the changes of load torque. This makes the vibration-inducing torque smaller, so that the vibration of the compressor can be reduced. However, when the motor torque is changed in a way that reduces the vibration-inducing torque, the current that flows in the motor increases in turn, and this might give rise to cases where the loss of the motor increases and the efficiency of the compressor and the motor decreases.

The compressor control method according to this embodiment controls the vibration of the compressor to be reduced in a specific operating area, thereby reducing the vibration of the compressor and reducing the decrease in the efficiency of the compressor within a range in which the vibration of the compressor does not pose a practical problem.

Figure 2:
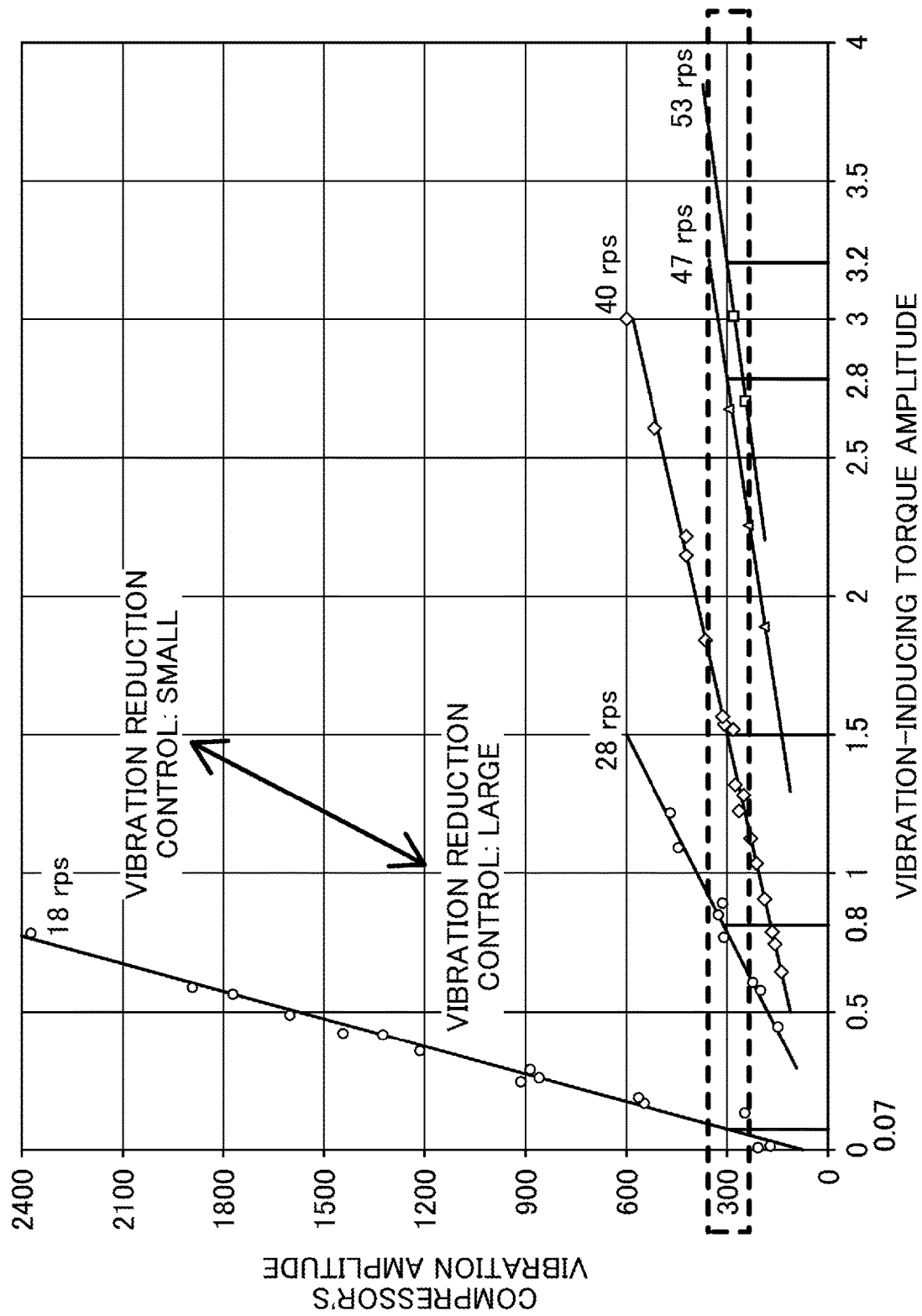
FIG. 2 is a diagram illustrating the relationship between the amplitude of vibration-inducing torque and the vibration amplitude of the compressor per number of revolutions of a motor per unit time.

FIG. 2 is a diagram illustrating the relationship between the amplitude of vibration-inducing torque and the vibration amplitude of the compressor per number of revolutions of the motor per unit time (that is, for each of 18 rps, 28 rps, 40 rps, 47 rps, and 57 rps). rps is an abbreviation for the number of revolutions per second, and is the unit to represent the number of times a motor repeats revolving in one second. rps is also written as $s^{-1}$. Note that the specific numerical values illustrated in FIG. 2 and elsewhere are simply examples, and the art of the present disclosure does not have to be limited to these numerical values.

It is preferable to control the vibration amplitude of the compressor at a constant level (300 μm in the case of FIG. 2) from the viewpoint of reducing the vibration of the compressor and reducing the decrease of efficiency. As illustrated in FIG. 2, the amplitude of vibration-inducing torque for controlling the vibration amplitude of the compressor at a substantially constant level varies depending on the number of revolutions of the motor per unit time (rotation speed).

Figure 3:
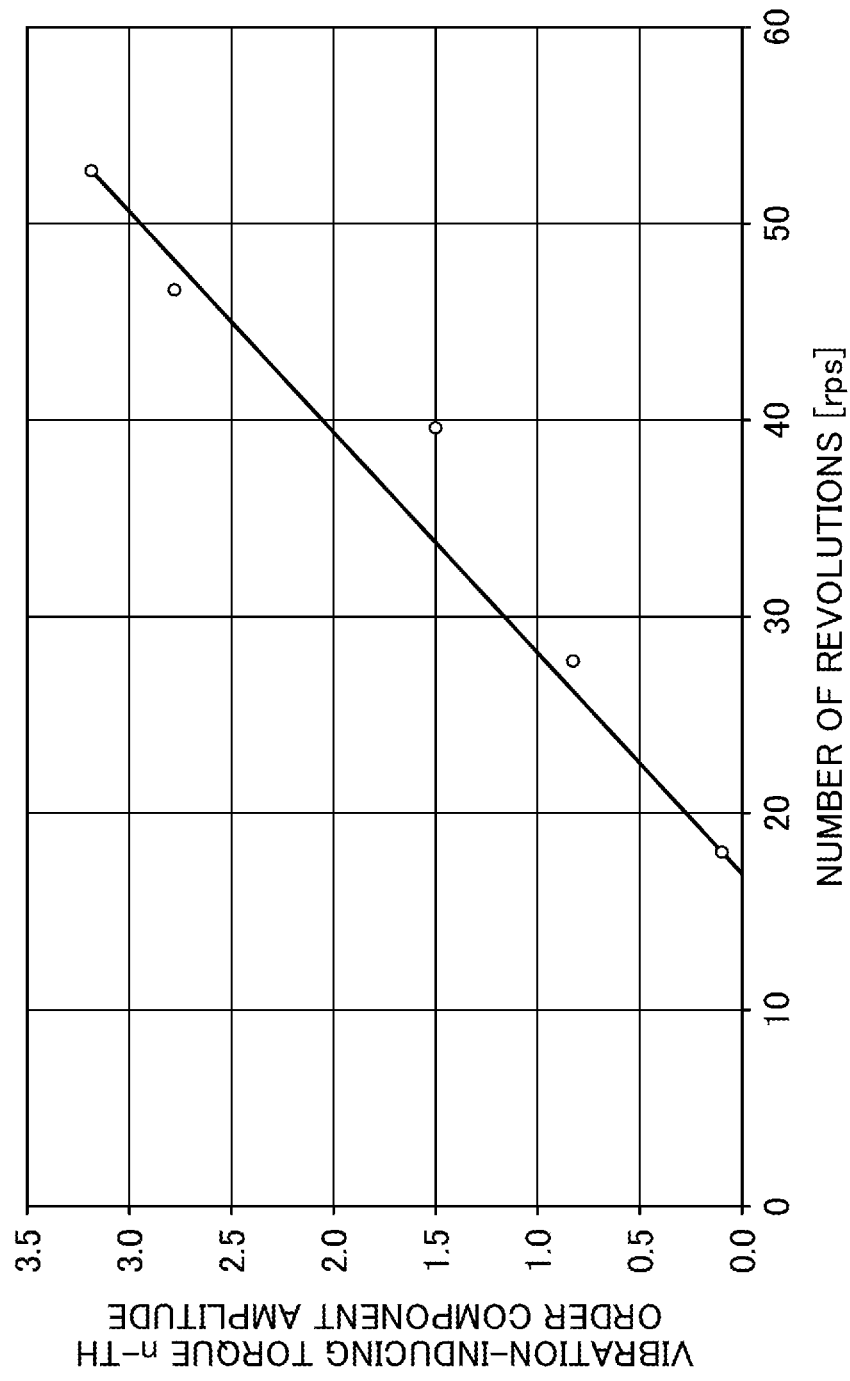
FIG. 3 is a diagram illustrating the relationship between the number of revolutions of the motor per unit time and the amplitude of vibration-inducing torque for controlling the vibration amplitude of the compressor at a substantially constant level.

FIG. 3 is a diagram that illustrates the relationship between the number of revolutions of the motor per unit time and the amplitude of vibration-inducing torque for controlling the vibration amplitude of the compressor at a substantially constant level. The vibration amplitude of the compressor can be controlled at a substantially constant level by applying vibration reduction control for changing the amplitude value of vibration-inducing torque to amplitude values that are in accordance with the number of revolutions of the motor per unit time based on the relationship illustrated in FIG. 3. For example, a command value for vibration-inducing torque corresponding to a number of revolutions of the motor per unit time is derived based on a table showing the approximating straight line (approximating curve) illustrated in FIG. 3, and the motor torque is adjusted according to an operation amount corresponding to that derived command value. By performing such vibration reduction control in a specific operating area, the vibration amplitude of the compressor is controlled at a substantially constant level regardless of the changes of the load that is imposed on the motor and the number of revolutions of the motor per unit time, so that
it is possible to reduce the vibration of the compressor and reduce the decrease of efficiency in the specific operating area.

Note that the above specific operating area refers to an area that is determined by, for example, at least one of a predetermined load-varying range in which the load that is imposed on the motor might vary, and a predetermined rps range in which the number of revolutions of the motor per unit time might vary. The specific operating area may be set as appropriate according to the range in which the reduction of the vibration of the compressor and the reduction of the decrease of efficiency are desirable.

Also, the variable to increase or decrease according to the vibration amplitude of the compressor is not limited to vibration-inducing torque, and may be, for example, the magnitude of variation of the motor's magnetic pole positions, the magnitude of variation of the motor's rotation speed, and so forth. The magnitude of variation refers to the difference (the amount of variation) between the maximum value and the minimum value. Similar to vibration-inducing torque, the magnitude of variation of magnetic pole positions (or the magnitude of variation of rotation speed) in the event the vibration amplitude of the compressor is controlled to a substantially constant level varies depending on the number of revolutions of the motor per unit time. That is, the vibration-inducing torque on the vertical axis of FIG. 3 can be replaced with the magnitude of variation of magnetic pole positions or the magnitude of variation of rotation speed.

Therefore, the vibration amplitude of the compressor can be controlled to a substantially constant level by changing the magnitude of variation of magnetic pole positions to a value that is in accordance with the number of revolutions of the motor per unit time, based on the relationship between the number of revolutions of the motor per unit time and the magnitude of variation of magnetic pole positions for controlling the vibration amplitude of the compressor. Similarly, the vibration amplitude of the compressor can be controlled to a substantially constant level by changing the magnitude of variation of rotation speed to a value that is in accordance with the number of revolutions of the motor per unit time, based on the relationship between the number of revolutions of the motor per unit time and the magnitude of variation of rotation speed for controlling the vibration amplitude of the compressor.

Next, a number of embodiments will be described in more detail.

Figure 4:
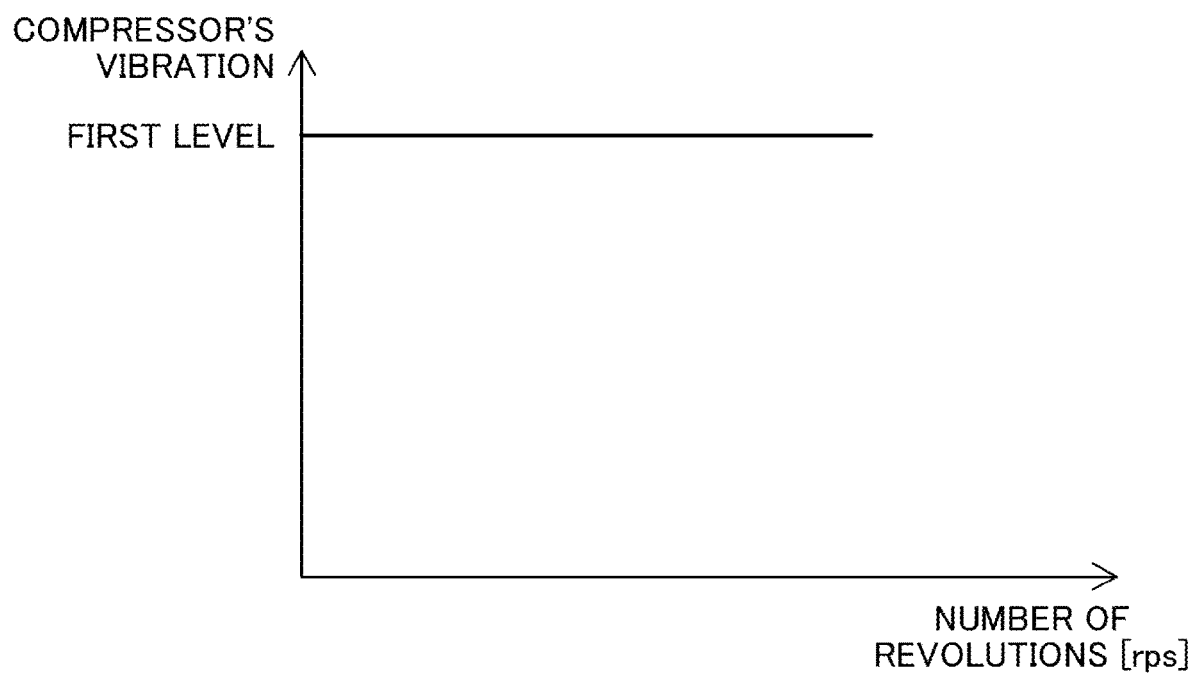
FIG. 4 is a diagram for explaining a compressor control method according to a first embodiment.

FIG. 4 is a diagram for explaining the compressor control method according to the first embodiment. The compressor control method according to the first embodiment controls, in a specific operating area, the vibration amplitude of a compressor to a first level, regardless of the load imposed on the motor and the changes of the number of revolutions of the motor per unit time. By this means, it is possible to reduce the vibration of the compressor and reduce the decrease of efficiency in a specific operating area.

For example, when the compressor is operating in a first operating area that is determined by the load imposed on the motor and the number of revolutions of the motor per unit time, the compressor control method according to the first embodiment controls the vibration amplitude of the compressor to a first level, regardless of the load on the motor and the changes of the number of revolutions of the motor per unit time. On the other hand, when the compressor is operating in a second operating area in which the vibration amplitude of the compressor is smaller than in the first operating area, the compressor control method according to the first embodiment prohibits controlling the vibration amplitude of the compressor to the first level. This makes it possible to reduce the deterioration of vibration caused by controlling (increasing) the vibration amplitude of the compressor to the first level in the second operating area.

FIG. 5 is a diagram for explaining the compressor control method according to a second embodiment. The compressor control method according to the second embodiment has a first mode, in which the vibration amplitude of the compressor is controlled to the first level when the load imposed on the motor becomes less than or equal to the first threshold that is set for every number of revolutions of the motor per unit time (in the case of FIG. 5, the first threshold refers to thresholds L1a, L2a, and L3a). On the other hand, the compressor control method according to the second embodiment has a second mode, in which the vibration amplitude of the compressor is controlled to a second level, which is lower than the first level, when the load imposed on the motor rises above a second threshold that is set for each number of revolutions of the motor per unit time (in the case of FIG. 5, the second threshold refers to thresholds L1b, L2b, and L3b). The first threshold is set to be less than or equal to the second threshold. The more the load on the motor increases, the more the vibration amplitude of the compressor tends to increase. According to the compressor control method of the second embodiment, when the load on the motor rises above the second threshold, the vibration amplitude of the compressor is controlled to the second level, which is lower than the first level, so that the increase of the vibration amplitude of the compressor can be reduced.

FIG. 5 shows examples of thresholds L2a and L2b set for an rps range from R1 to R2, thresholds L1a and L1b set for an rps range from R2 to R3, and thresholds L3a and L3b set for an rps range from R3 to R4. The number of thresholds and the relationships between multiple thresholds are unspecified, and may be set as appropriate. In the case of FIG. 5, threshold L1a is lower than threshold L1b. Threshold L2a is lower than threshold L2b. Threshold L3a is lower than threshold L3b. By providing such a hysteresis between each first threshold and second threshold, even if the load imposed on the motor swings up and down in the vicinity of the first threshold or the second threshold, it is still possible to prevent the control level of vibration amplitude from switching frequently between the first level and the second level. If the first threshold and the second threshold have the same value, it is not necessary to provide hysteresis. A single threshold L2 (L2a=L2b) may be set for the rps range 3C of R1 to R2. A single threshold L1 (L1a=L1b) may be set for the rps range of R2 to R3. A single threshold L3 (L3a=L3b) may be set for the rps range of R3 to R4.

Furthermore, according to the compressor control method of the second embodiment, in an operating area where the load on the motor is less than or equal to the first threshold, the vibration amplitude of the compressor is allowed to be at the first level, which is higher than the second level, and therefore the degree of vibration reduction is relaxed. As a result of this, in the operating area where the load on the motor is less than or equal to the first threshold, while the vibration amplitude of the compressor is kept reduced, the efficiency of the compressor and the like can be improved compared to an operating area where the load on the motor is larger than the second threshold.

For an operating area where the load on the motor is less than or equal to a predetermined threshold L (for example, the first threshold), for example, an operating area in which an air conditioner exerts the capacities defined by Japanese Industrial Standards (JIS) is set. To be more specific, given the eight capacities set forth in JIS B8616: 2015 (namely, rated cooling standard capacity, intermediate cooling standard capacity, intermediate cooling medium temperature capacity, minimum cooling medium temperature capacity, rated heating standard capacity, intermediate heating standard capacity, minimum heating standard capacity, and maximum heating low temperature capacity), it is preferable if at least one of these capacities is set in the operating area where the load on the motor is less than or equal to the predetermined threshold L. By this means, in a specific operating area, the efficiency of the compressor or the like can be improved while keeping the vibration amplitude of the compressor reduced, so that the annual performance coefficient (APF) set forth in JIS B8616: 2015 can be improved.

FIG. 6 is a diagram for explaining the compressor control method according to a third embodiment. The compressor control method according to the third embodiment has a third mode, in which the vibration amplitude of the compressor is controlled between the first level and the second level. According to the compressor control method of the third embodiment, even if the vibration amplitude of the compressor cannot be controlled to the second level for some reason (for example, due to hardware limitations of the inverter), the compressor's vibration amplitude is still controlled between the first level and the second level, so that the vibration of the compressor can be reduced.

Next, example configurations of the motor control device that executes the compressor control method according to each embodiment will be described below.

Figure 7:
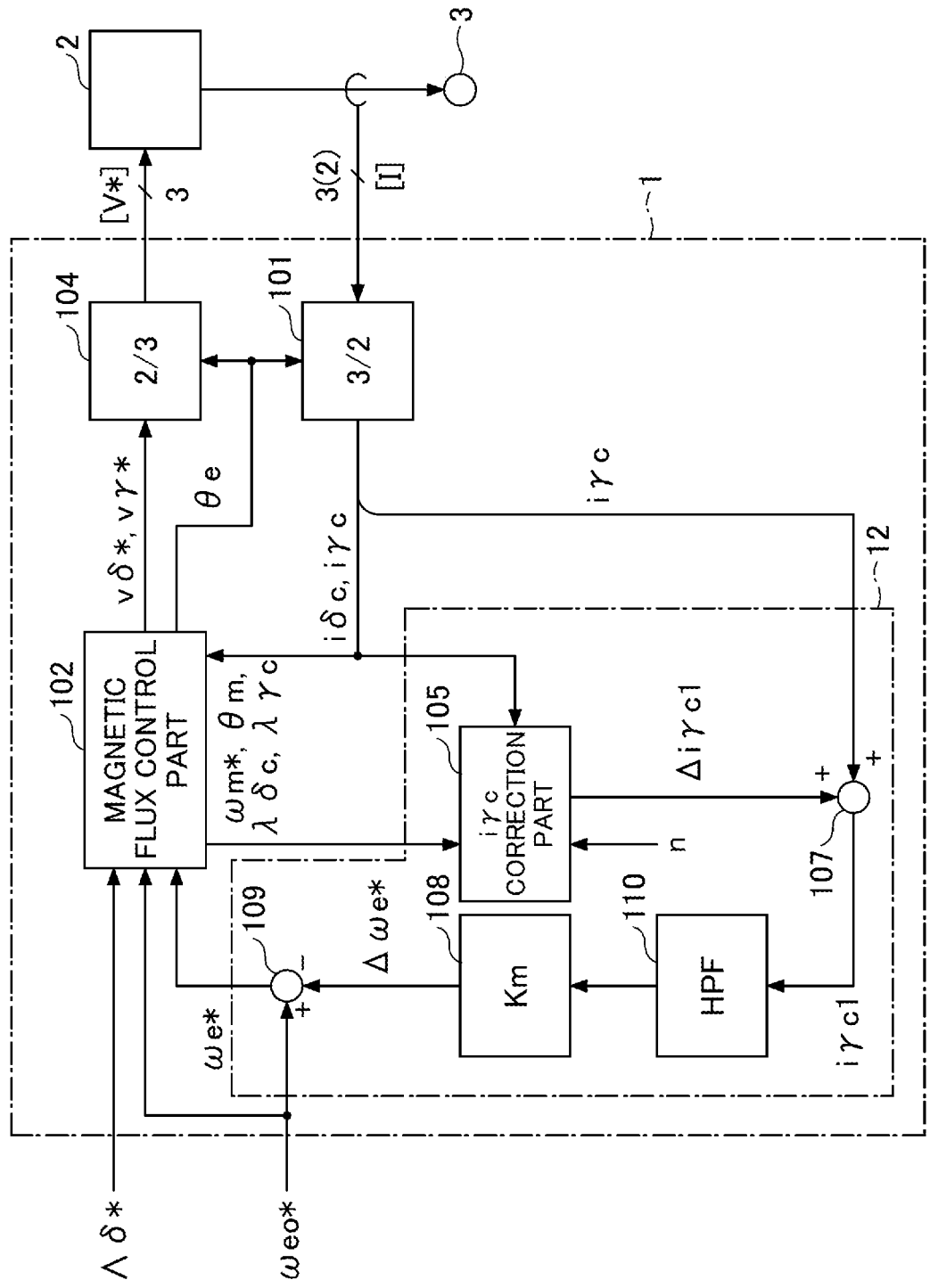
FIG. 7 is a block diagram illustrating the configuration of a motor control device and its peripheral devices.

FIG. 7 is a block diagram illustrating the configuration of the motor control device and its peripheral devices. The motor control device 1 illustrated in FIG. 7 controls a synchronous motor 3. The synchronous motor 3 is an example of a motor for driving a compressor, which is a device for compressing a refrigerant.

The synchronous motor 3 is a three-phase rotary motor, and equipped with an armature and a rotor, which is a field system (neither shown). Technically, it is commonly known that the armature has armature windings and the rotor rotates relative to the armature. The field system includes, for example, a magnet (field magnet: not shown) that generates a field magnetic flux, and for example, an embedded magnet type may be employed.

A voltage supply source 2 includes, for example, a voltage control type inverter and its control part, and applies a three-phase voltage to the synchronous motor 3 based on a three-phase voltage command value [V*] (the symbol [ ] indicates that this is a vector). As a result of this, a three-phase current [I] flows from the voltage supply source 2 to the synchronous motor 3.

The motor control device 1 controls the primary magnetic flux and the rotation speed (in the example below, the rotational angular velocity) of the synchronous motor 3. The primary magnetic flux is a combination of a field magnetic flux $\Lambda 0$ that is generated from the field magnet, and the armature reaction-induced magnetic flux that is generated by the armature current (which is also three-phase current [I]) flowing in the synchronous motor 3 (in the armature, to be more specific). A primary magnetic flux command $\Lambda \delta^*$ is a command value for the actual magnitude of the primary magnetic flux, $\Lambda \delta$.

The motor control device 1 controls the synchronous motor 3 by controlling the primary magnetic flux of the synchronous motor 3 based on a method of matching the primary magnetic flux of the synchronous motor 3 with primary magnetic flux command $\Lambda \delta^*$ on a $\delta c$ axis, which is the control axis for primary magnetic flux. The $\delta c$ axis is advanced relative to a d axis by a predetermined phase difference. The d axis represents the phase of field magnetic flux $\Lambda 0$ in a rotational coordinate system. The actual primary magnetic flux has a $\delta c$-axis component $\lambda \delta c$ on the $\delta c$ axis and a $\gamma c$-axis component $\lambda \gamma c$ on a $\gamma c$ axis. The $\gamma c$ axis is advanced relative to the $\delta c$ axis by an electrical angle of 90 degrees. Hereinafter, expressions such as primary magnetic flux $\lambda \delta c$ and $\lambda \gamma c$ may be simply used.

Usually, the command value for the primary magnetic flux is configured such that the $\gamma c$-axis component is set to zero and the $\delta c$-axis component is set to primary magnetic flux command $\Lambda \delta^*$, as described above. In other words, the motor control device 1 performs control for making $\gamma c$-axis component $\lambda \gamma c$ of the actual primary magnetic flux zero, and obtains a predetermined phase difference. Such control is commonly known as primary magnetic flux control and is in the public domain. Usually, the primary magnetic flux and the rotation speed are employed as controllable amounts in primary magnetic flux control.

In this embodiment, the primary magnetic flux may be an estimated value or an observed value. Arts for estimating primary magnetic flux are also in the public domain.

The motor control device 1 includes a first coordinate conversion part 101, a magnetic flux control part 102, a second coordinate conversion part 104, and a speed command correction device 12. The functions of each of these parts included in the motor control device 1 are implemented by operating a processor (for example, a CPU (Central Processing Unit)) with a program that is readably stored in a memory.

The first coordinate conversion part 101 performs three-phase-to-two-phase conversion based on an electrical angle $\theta e$ of the synchronous motor 3 obtained as described later. To be more specific, three-phase current [I] is converted into a $\delta c$-axis current $i\delta c$ and a $\gamma c$-axis current $i\gamma c$ in a $\delta c$-$\gamma c$ rotation coordinate system where primary magnetic flux control is performed. At this time, since the sum of the three phases of the three-phase current becomes zero, if the currents of two phases are obtained, the current of the other one phase can be estimated from the currents of these two phases. "3 (2)" in FIG. 7 indicates that either the currents of three phases may be detected or the currents of two phases may be detected. It is possible to say that $\delta c$-axis current $i\delta c$ and $\gamma c$-axis current $i\gamma c$ are the $\delta c$-axis component and the $\gamma c$-axis component of the current flowing in the synchronous motor 3, respectively.

The second coordinate conversion part 104 performs two-phase-to-three-phase conversion based on electrical angle $\theta e$. To be more specific, the second coordinate conversion part 104 converts $\delta c$-axis voltage command value vδ* and γc-axis voltage command value vγ* in the δδc-γc rotation coordinate system into three-phase voltage command value [V*].

Note that δc-axis voltage command value vδ* and γc-axis voltage command value vγ* may be converted into voltage command values of other coordinate systems such as a dq rotation coordinate system, instead of three-phase voltage command value [V*]. Other coordinate systems, such as αβ fixed coordinate system, uvw fixed coordinate system, and polar coordinate system can be employed as well.

From a rotation speed command ωeo* (for the electrical angle), the magnetic flux control part 102 determines a corresponding rotation speed command ωm* (for the mechanical angle). Such a function can be easily realized by using publicly available arts, and therefore the details thereof will be omitted.

The magnetic flux control part 102 has, for example, an integration function. With this integration function, rotation speed command ωe* is integrated, and electrical angle θe is obtained. From electrical angle θe obtained thus and a load angle φ relative to the d axis of the primary magnetic flux, rotation angle θm can be obtained as a mechanical angle from equation (1). However, a pole pair P of the synchronous motor 3 is introduced.

$$\theta m=(\theta e-\varphi)/p \quad \text{(Equation 1)}$$

Load angle φ may be an estimated value or an observed value. Arts for estimating load angle φ are in the public domain. Furthermore, as for the method of obtaining rotation angle θm, arts that are in the public domain, other than equation (1), can be employed as well.

The magnetic flux control part 102 generates a δc-axis voltage command value vδ* and a γc-axis voltage command value vγ* based on δc-axis current iδc, γc-axis current iγc, primary magnetic flux λδc and λγc, primary magnetic flux command Λδ*, and rotation speed command ωe*. This function, the configuration for implementing this function, and the method for estimating primary magnetic flux λδc and λγc are in the public domain, and therefore the details thereof will be omitted here.

The speed command correction device 12 includes a γc-axis current correction part 105 (shown as "iγc correction part" in FIG. 7), an adder 107, a subtractor 109, and a high-pass filter 110.

The γc-axis current correction part 105 determines a first γc-axis current correction value Δiγc1 based on rotation angle θm, rotation speed command ωm*, primary magnetic flux λδc and λγc, δc-axis current iδc, γc-axis current iγc, and an order n. First γc-axis current correction value Δiγc1 is an amount to reduce the n-th order components (where n is a positive integer) of the fundamental frequency of rotation angle θm. Its specific significance and the method of determining it will be described later.

The adder 107 adds first γc-axis current correction value Δiγc1 to γc-axis current iγc, and thus obtains first corrected γc-axis current iγc1. The high-pass filter 110 functions as a DC component removing part that removes the DC component from first corrected γc-axis current iγc1 and determines angular velocity correction amount Δωe*. As shown in the drawing, the speed command correction device 12 may further include a constant multiplication part 108, and angular velocity correction amount Δωe* may be obtained based on the assumption that the output of the high pass filter 110 multiplied by a predetermined gain Km in the constant multiplication part 108.

The subtractor 109 subtracts angular velocity correction amount Δωe* from rotation speed command ωeo* for the electrical angle, and thus obtains corrected rotation speed command ωe*.

Figure 8:
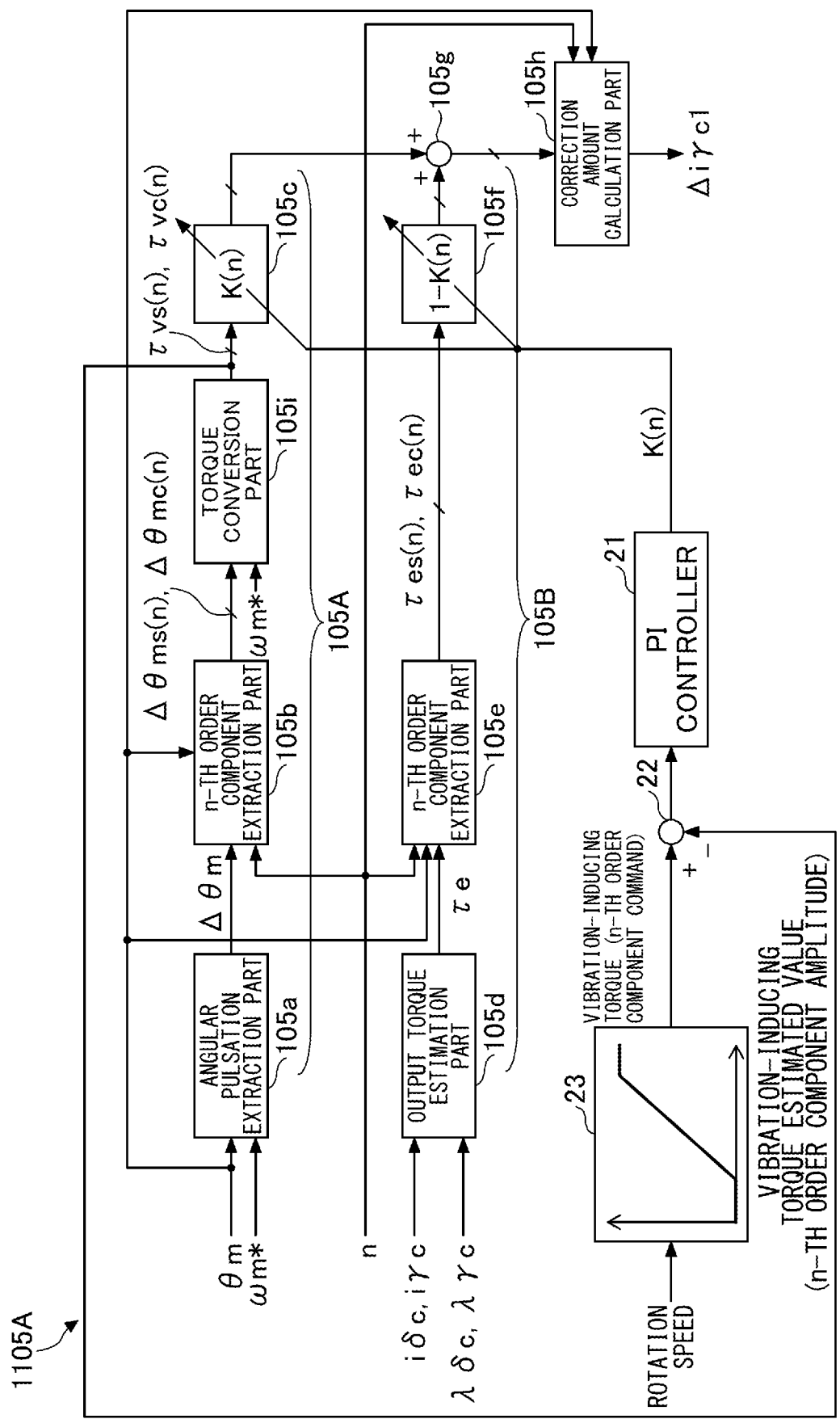
FIG. 8 is a block diagram illustrating a first example configuration of a γc-axis current correction part according to the first embodiment.

FIG. 8 is a block diagram illustrating a first example configuration of the γc-axis current correction part according to the first embodiment. The γc-axis current correction part 1105A illustrated in FIG. 8 is an example of the γc-axis current correction part 105 (see FIG. 7). The γc-axis current correction part 1105A includes a vibration-inducing torque extraction part 105A, an output torque extraction part 105B, an adder 105g, and a correction amount calculation part 105h.

The vibration-inducing torque extraction part 105A has an angular pulsation extraction part 105a, an n-th order component extraction part 105b, a torque conversion part 105i, and an apportionment coefficient multiplication part 105c.

The angular pulsation extraction part 105a determines a rotation angle difference Δθm from rotation angle θm and rotation speed command ωm*. Rotation angle difference Δθm represents the pulsation component of rotation angle θm relative to rotation angle θm while the synchronous motor 3 is rotating at constant speed.

The n-th order component extraction part 105b extracts n-th order components Δθms(n) and Δθmc(n) of the fundamental frequency of rotation angle Δθm, from rotation angle difference Δθm. The n-th order component extraction part 105b divides the components of rotation angle difference Δθm of the order to be extracted, into a sine value component Δθms(n) and a cosine value component Δθmc(n), and handles these. The specific operation of the n-th order component extraction part 105b will be described later.

The torque conversion part 105i converts n-th order components Δθms(n) and Δθmc(n) into torque. To be more specific, given an estimated value for vibration-inducing torque τv of the synchronous motor 3 at rotation angle θm, the torque conversion part 105i determines n-th order components τvs(n) and τvc(n). For example, the torque conversion part 105i determines the n-th order components of vibration-inducing torque τv by multiplying n-th order components Δθms(n) and Δθmc(n) of rotation angle difference Δθm by the product of inertial moment J of mechanical load, the square of rotation speed command ωm*, and the square of order n ($=-n^2 \cdot J \cdot \omega m^{*2}$). To be more specific, n-th order sine value component τvs(n) and cosine value component τvc(n) of vibration-inducing torque τv are determined.

Vibration-inducing torque τv is the value obtained by subtracting load torque τd of the mechanical load (not shown) that the synchronous motor 3 drives, from output torque τe of the synchronous motor 3.

$$\tau v=\tau e-\tau d \quad \text{(Equation 2)}$$

Load torque τd has periodicity. That is, the synchronous motor 3 drives a periodic load. An example of this mechanical load is, for example, a compressor mechanism (compressor) for compressing a refrigerant used in an air conditioner.

Vibration-inducing torque τv has components ("n-th order components" described above) that vary in a period of 1/n of the period of rotation angle θm. These components have independent amplitudes per order. For example, if the mechanical load is a one-cylinder compressor, the amplitude of the first-order component corresponding to n=1 is the main component. If the mechanical load is a two-cylinder compressor, the amplitude of the second-order component corresponding to n=2 is the main component.

The output torque extraction part 105B has an output torque estimation part 105d, an n-th order component extraction part 105e, and an apportionment coefficient multiplication part 105f.

Using primary magnetic flux λδc and λγc, δc-axis current iδc, and γc-axis current iγc, the output torque estimation part 105d determines an estimated value of output torque τe from equation (7):

$$\tau e = P \cdot (\lambda \delta c \cdot i\gamma c - \lambda \gamma c \cdot i\delta c) \quad \text{(Equation 7)}$$

Since the difference between the estimated value of output torque τe and its actual value is not dealt with here, the expression "output torque τe" is used for both output torque τe and its estimated value for ease of explanation.

The n-th order component extraction part 105e extracts n-th order components τes(n) and τec(n) of the fundamental frequency of rotation angle θm from output torque τe in the same manner as in the n-th order component extraction part 105b.

To be more specific, the nth-order component extraction parts 105b and 105e both obtain the sine value component and the cosine value component of the input amount, by using the Fourier transform. Rotation angle difference Δθm and output torque τe are both functions of rotation angle θm. When both of these are expressed as function F(θm), equation (8) holds.

$$F(\theta m) = \frac{a0}{2} + \sum_{n=1}^{\infty} \{an \cdot \cos(n \cdot \theta m) + bn \cdot \sin(n \cdot \theta m)\} \quad (8)$$

$(n = 1, 2, 3, \ldots)$ $$\begin{cases} a0 = \frac{1}{\pi} \int_{-\pi}^{\pi} F(\theta m) d\theta m \\ an = \frac{1}{\pi} \int_{-\pi}^{\pi} \{F(\theta m) \cdot \cos(n \cdot \theta m)\} d\theta m \\ bn = \frac{1}{\pi} \int_{-\pi}^{\pi} \{F(\theta m) \cdot \sin(n \cdot \theta m)\} d\theta m \end{cases}$$

(Equation 8)

Here, the value a0 is a DC component (zero-th order component) of function F(θm). The value an is the amplitude of the cosine value of the n-th order component of function F(θm). The value bn is the amplitude of the sine value of the n-th order component of function F(θm). In order to perform the above-noted Fourier transform, order n and rotation angle θm are input to the n-th order component extraction parts 105b and 105e. Note that time t may be employed as the integration variable in equation (8), instead of rotation angle θm. In the calculation performed by the Fourier transform, rotation angle θm can be substituted by angle θmf (=ωma·t). ωma represents the average value of angular velocity (average angular velocity).

The n-th order component extraction part 105b employs rotation angle difference Δθm as function F(θm), outputs value bn as sine value component Δθms(n) of rotation angle difference Δθm, and outputs value an as cosine value component Δθmc(n) of rotation angle difference Δθm.

The n-th order component extraction part 105e employs output torque τe as function F(θm), outputs value bn as sine value component τes(n) of output torque τe, and outputs value an as cosine value component τec(n) of output torque τe.

The apportionment coefficient multiplication part 105c multiplies both sine value component τvs(n) and cosine value component τvc(n) by an apportionment coefficient K(n), which is set for each order n. The apportionment coefficient multiplication part 105f multiplies both sine value component τes(n) and cosine value component τec(n) by an apportionment coefficient [1−K(n)]. However, 0⇐K(n)⇐1 holds in each order n. Therefore, the apportionment coefficient multiplication parts 105c and 105f function as an apportionment part for proportionally dividing sine value component τvs(n) and sine value component τes(n) based on predetermined apportionment ratios K(n)/[1−K(n)] and proportionally dividing cosine value component τvc(n) and cosine value component τec(n) based on the these apportionment ratios. Apportionment coefficients K(n) and [1−K(n)] may be given to the apportionment coefficient multiplication parts 105c and 105f from outside. In this case, the apportionment coefficient multiplication parts 105c and 105f are implemented by simple multipliers.

For each order n, the adder 105g adds up products τvs(n)·[1−K(n)] and τes(n)·[1−K(n)] related to the sine value components, adds up products τvc(n)·K(n) and τec(n)·[1−K(n)] related to the cosine value components, and outputs the pair of sums.

In the n-th order component extraction parts 105b and 105e, a plurality of orders n to be extracted may be employed. For example, when only the value 1 is employed as an order n, the adder 105g outputs a pair of sums τvs(1)·K(1)+τes(1)·[1−K(1)] and τvc(1)·K(1)+τec(1)·[1−K(1)]. Alternatively, when two values 1 and 2 are employed as orders n, the adder 105g outputs two pairs of sums, namely a pair of sums τvs(1)·K(1)+τes(1)·[1−K(1)] and τvc(1)·K(1)+τec(1)·[1−K(1)] and a pair of sums τvs(2)·K(2)+τes(2)·[1−K(2)] and τvc(2)·K(2)+τec(2)·[1−K(2)]. The slant "/" attached to the arrows in FIG. 8 indicate that such pairs are input/output.

By introducing n-th order sine value component τds(n) and cosine value component τdc(n) for load torque τd, following equations (9) can be obtained from equation (2):

$$\tau vs(n) = \tau es(n) - \tau ds(n)$$

$$\tau vc(n) = \tau ec(n) - \tau dc(n) \quad \text{(Equation 9)}$$

Therefore, the adder 105g can output paired values τes(n)−K(n)·τds(n) and τec(n)−K(n)·τdc(n).

Figure 9:
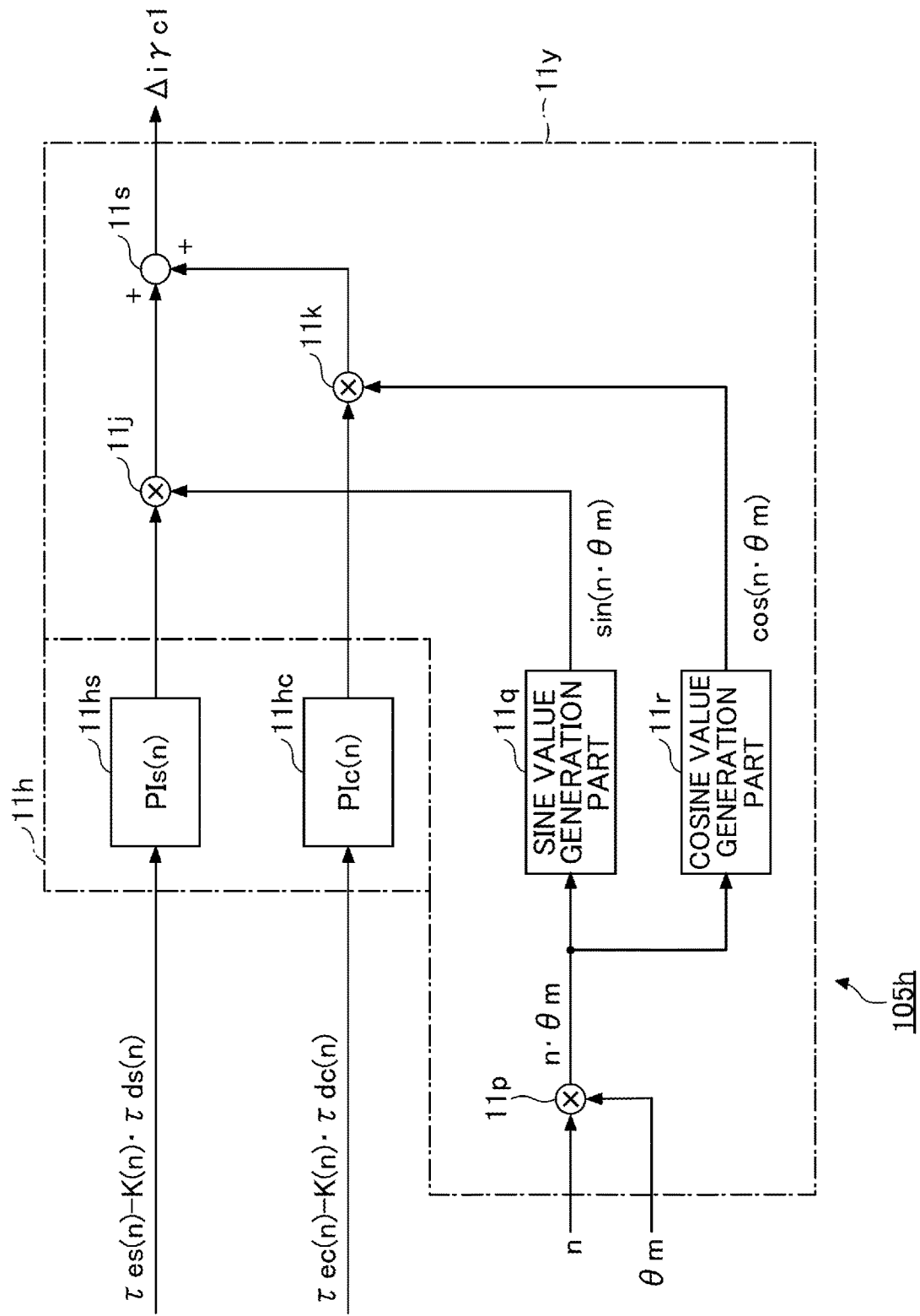
FIG. 9 is a block diagram illustrating an example configuration of a correction amount calculation part.

FIG. 9 is a block diagram illustrating an example configuration of the correction amount calculation part 105h. The correction amount calculation part 105h includes a PI control part 11h and a composite value calculation part 11y. Here, for ease of explanation, an example case where order n is 1 will be described.

The PI control part 11h includes PI controllers 11hs and 11hc that perform proportional integration control. The PI controller 11hs performs proportional integration control on the values related to sine value components. The PI controller 11hc performs proportional integration control on the values related to cosine value components.

The PI controller 11hs receives as input value τes(n)−K(n)·τds(n), and outputs the result of proportional integration control. The PI controller 11hc receives as input value τec(n)−K(n)·τdc(n), and outputs the result of proportional integration control.

The composite value calculation part 11y combines the result of proportional integration control of the sine value components obtained in the PI controller 11hs and the result of proportional integration control of the cosine value components obtained in the PI controller 11hc as follows, and determines a composite value.

The composite value calculation part 11y has a multipliers 11j, 11k and 11p, a sine value generation part 11q, a cosine value generation part 11r, and an adder 11s.

The multiplier $11p$ receives order n and rotation angle θm as input and obtains the product nθm of both. The sine value generation part $11q$ receives product nθm as input and obtains a sine value sin(nθm). The cosine value generation part $11r$ receives product nθm as input and obtains a cosine value cos(nθm).

The multiplier $11j$ obtains the product of the result obtained in the PI controller $11hs$ and a sine value sin(nθm). The multiplier $11k$ obtains the product of the result obtained in the PI controller $11hc$ and a cosine value cos(nθm). The adder $11s$ performs combination of trigonometric functions and obtains a composite value. To be more specific, for the composite value, the adder $11s$ obtains the sum of the product obtained in the multiplier $11j$ and the product obtained in the multiplier $11k$. This composite value is output from the composite value calculation part $11y$ as a first γc-axis current correction value Δiγc1. This is equivalent to using the results obtained in the PI controllers $11hs$ and $11hc$ as coefficients in a Fourier series and determining first γc-axis current correction value Δiγc1 from the result of this Fourier series.

First γc-axis current correction value Δiγc1 determined based on n-th order components of vibration-inducing torque τv and output torque τe is reflected in a γc-axis current iγc by the adder 107 (see FIG. 7). As a result of this, in the subtractor 109, rotation speed command ωeo* is corrected in the direction of increase, in accordance with the increase of vibration-inducing torque τv and/or the increase of output torque τe. As described above, first γc-axis current correction value Δiγc1 is obtained by applying proportional integration control to the pulsation of vibration-inducing torque τv and output torque τe, and therefore corrected rotation speed command ωe* is controlled to reduce the pulsation of vibration-inducing torque τv and output torque τe.

Before proportional integration control is performed in the correction amount calculation part $105h$ (see FIG. 8), the impact of vibration-inducing torque τv and output torque τe upon rotation speed command ωeo* is proportionally divided based on apportionment coefficients K(n) and [1−K(n)]. This is preferable not only from the viewpoint that the apportionment ratio can be maintained regardless of the gain of proportional integration control, but also from the viewpoint that a frequency band corresponding to the rotation speed of mechanical angle is not required in proportional integration control.

When a plurality of orders n are configured, the correction amount calculation part $105h$ provides a PI control part $11h$ and a composite value calculation part $11y$, excluding the adder $11s$, for each order. Then, the adder $11s$ adds up all the outputs of the composite value calculation parts $11y$, provided per order, and outputs the sum of these as a first γc-axis current correction value Δiγc1.

Assume that apportionment coefficient K(n) is 1 at a certain order n. In this case, the output of the apportionment coefficient multiplication part $105f$ is 0, output torque τe does not contribute to first γc-axis current correction value Δiγc1, and only vibration-inducing torque τv contributes to the correction of rotation speed command ωeo*. In this case, only the correction of rotation speed command ωeo* contributes to the reduction of vibration-inducing torque τv.

Assume that apportionment coefficient K(n) is 0 at a certain order n. In this case, the output of the apportionment coefficient multiplication part $105c$ is 0, vibration-inducing torque τv does not contribute to first γc-axis current correction value Δiγc1, and only output torque τe contributes to the correction of rotation speed command ωeo*. In this case, only the correction of rotation speed command ωeo* contributes to the reduction of the pulsation of output torque τe, and this makes it easy to make the amplitude of current [I] constant.

In view of the foregoing, the γc-axis current correction part 105 may be configured by omitting the adder $105g$, the output torque extraction part 105B, and the apportionment coefficient multiplication part $105c$. In this configuration, the correction amount calculation part $105h$ determines first axis current correction value Δiγc1 by using sine value component τvs(n) and cosine value component τvc(n) (to be more specific, by performing proportional integration control on these components), without using sine value component τes(n) and cosine value component Tec(n). Even in such a configuration, vibration-inducing torque τv can be reduced by correcting rotation speed command ωeo*.

Similarly, the γc-axis current correction part 105 may be configured by omitting the adder $105g$, the vibration-inducing torque extraction part 105A, and the apportionment coefficient multiplication part $105f$. In this configuration, the correction amount calculation part $105h$ determines first axis current correction value Δiγc1 by using sine value component τes(n) and cosine value component τec (n) (to be more specific, by performing proportional integration control on these components), without using sine value component τvs(n) and cosine value component τvc(n). Even with such a configuration, the pulsation of output torque τe can be reduced by correcting rotation speed command ωeo*.

As described above, according to the γc-axis current correction part 1105A illustrated in FIG. 8, the vibration reduction amount of the compressor can be controlled by adjusting the magnitude of apportionment coefficient K(n). The γc-axis current correction part 1105A determines the n-th order components (vibration-inducing torque command) of the command value for vibration-inducing torque according to the detected value or the command value for the rotation speed of the synchronous motor 3. Then, the γc-axis current correction part 1105A determines the magnitude of apportionment coefficient K(n) to control the vibration amplitude of the compressor at a substantially constant level, according to the determined vibration-inducing torque command.

The γc-axis current correction part 1105A has a table 23, a subtractor 22, and a PI controller 21.

In the table 23, the relationship between the rotation speed of the synchronous motor 3 and vibration-inducing torque is configured in advance in order to control the vibration amplitude of the compressor at a substantially constant level in a specific operating area. The table 23 is equivalent to a table representing the approximating straight line (approximating curve) illustrated in FIG. 3 described above. The table 23 is defined by a regression equation or map data representing an approximating curve. The γc-axis current correction part 1105A determines a vibration-inducing torque command for controlling the vibration amplitude of the compressor at a substantially constant level, according to the detected value or the command value for the rotation speed of the synchronous motor 3, based on the table 23. This vibration-inducing torque command is an example of data that is read from the preconfigured table. By using this preconfigured table, the load of arithmetic process can be reduced.

The subtractor 22 calculates the error between the n-th order components of the command value of vibration-inducing torque and the n-th order components of the estimated value of vibration-inducing torque. The n-th order components of the estimated value of vibration-inducing torque are, for example, sine value component τvs(n) and cosine value component τvc(n).

The PI controller 21 derives an apportionment coefficient K(n) that brings the error calculated by the subtractor 22 close to zero, based on PI control. Apportionment coefficient K(n) may be calculated based on PID control as well. In PI control or PID control, P stands for proportion, I stands for integration, and D stands for differentiation.

By deriving apportionment coefficient K(n) in this way, the vibration amplitude of the compressor is controlled at a substantially constant level in a specific operating area, regardless of the load imposed on the synchronous motor 3 and the changes of the number of revolutions of the synchronous motor 3 per unit time. Therefore, it is possible to reduce the vibration of the compressor and reduce the decrease of efficiency in a specific operating area.

Figure 10:
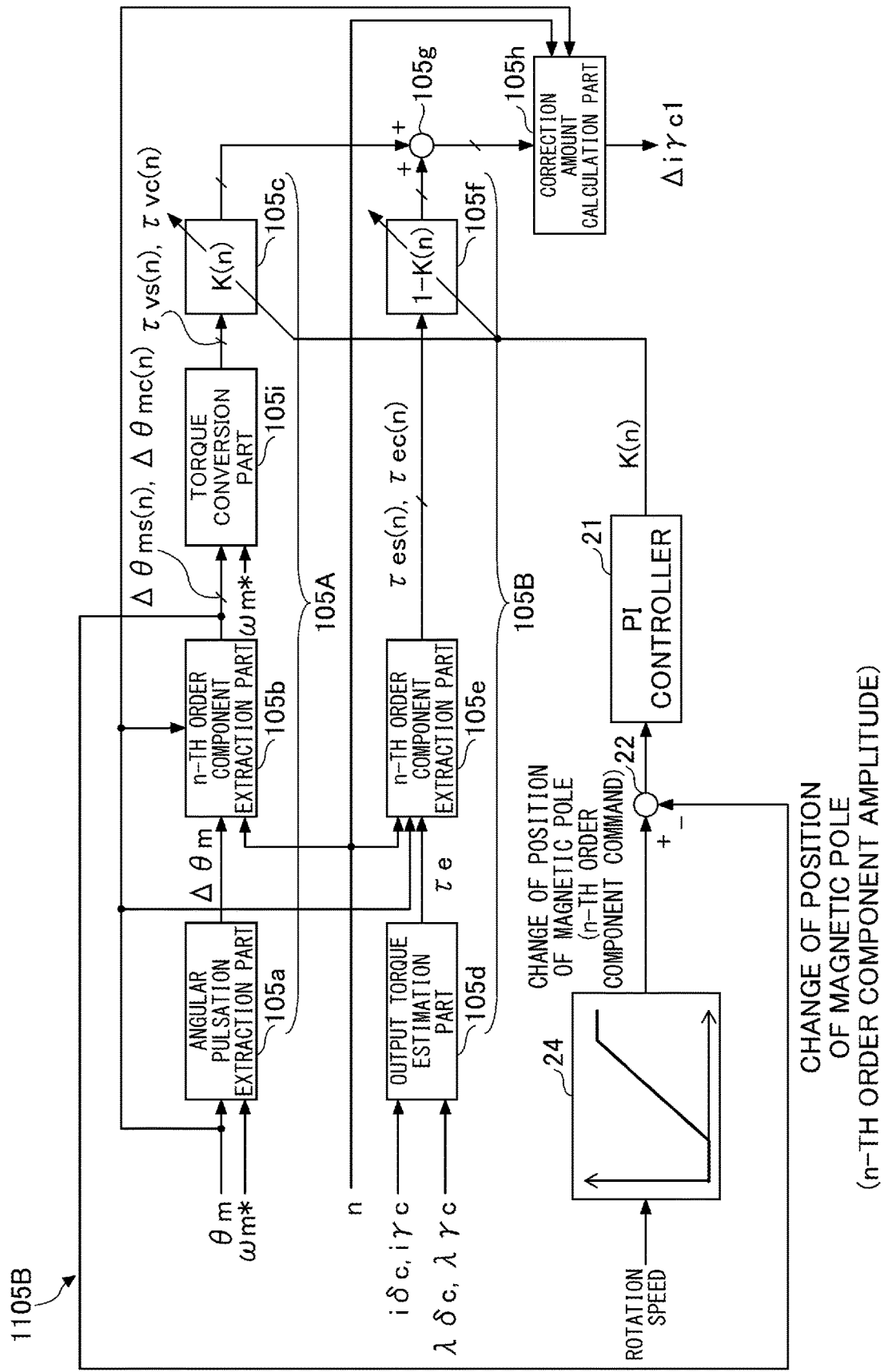
FIG. 10 is a block diagram illustrating a second example configuration of the γc-axis current correction part according to the first embodiment.

FIG. 10 is a block diagram illustrating a second example configuration of the γc-axis current correction part according to the first embodiment. The γc-axis current correction part 1105B illustrated in FIG. 10 is an example of the γc-axis current correction part 105 (see FIG. 7). The description of parts in the second example configuration (FIG. 10) that are the same as in the first example configuration (FIG. 8) will be omitted by making reference to the description given earlier herein.

The γc-axis current correction part 1105B determines the n-th order components (pole position variation amount command) of a command value for the magnitude of variation of the magnetic pole positions of the synchronous motor 3 according to the detected value or the command value for the rotation speed of the synchronous motor 3. Then, the γc-axis current correction part 1105B determines the magnitude of apportionment coefficient K(n) for controlling the vibration amplitude of the compressor at a substantially constant level, according to the magnetic pole position variation amount command determined.

The γc-axis current correction part 1105B has a table 24, a subtractor 22, and a PI controller 21.

The table 24 configures in advance the relationship between the rotation speed of the synchronous motor 3 and the magnitude of variation of magnetic pole positions, in order to control the vibration amplitude of the compressor at a substantially constant level in a specific operating area. The table 24 is equivalent to a table representing the approximating straight line (approximating curve) shown in FIG. 3 described above. The table 24 is defined by a regression equation or map data representing an approximating curve. The γc-axis current correction part 1105B determines the magnetic pole position variation amount command to control the vibration amplitude of the compressor at a substantially constant level, according to the detected value or the command value for the rotation speed of the synchronous motor 3, based on the table 24. This magnetic pole position variation amount command is an example of data read from the preconfigured table.

The subtractor 22 calculates the error between the n-th order components of the command value for the magnitude of variation of magnetic pole positions and the n-th order components of the estimated value of the magnitude of variation of magnetic pole positions. The n-th order components of the estimated value of the variation of magnetic pole positions is, for example, sine value component Δθms(n) and cosine value component Δθmc(n). The PI controller 21 derives an apportionment coefficient K(n) that brings the error calculated by the subtractor 22 close to zero, based on PI control or the like. By deriving apportionment coefficient K(n) in this way, it is possible to reduce the vibration of the compressor and reduce the decrease of efficiency in a specific operating area, as in the above-described example configuration.

Figure 11:
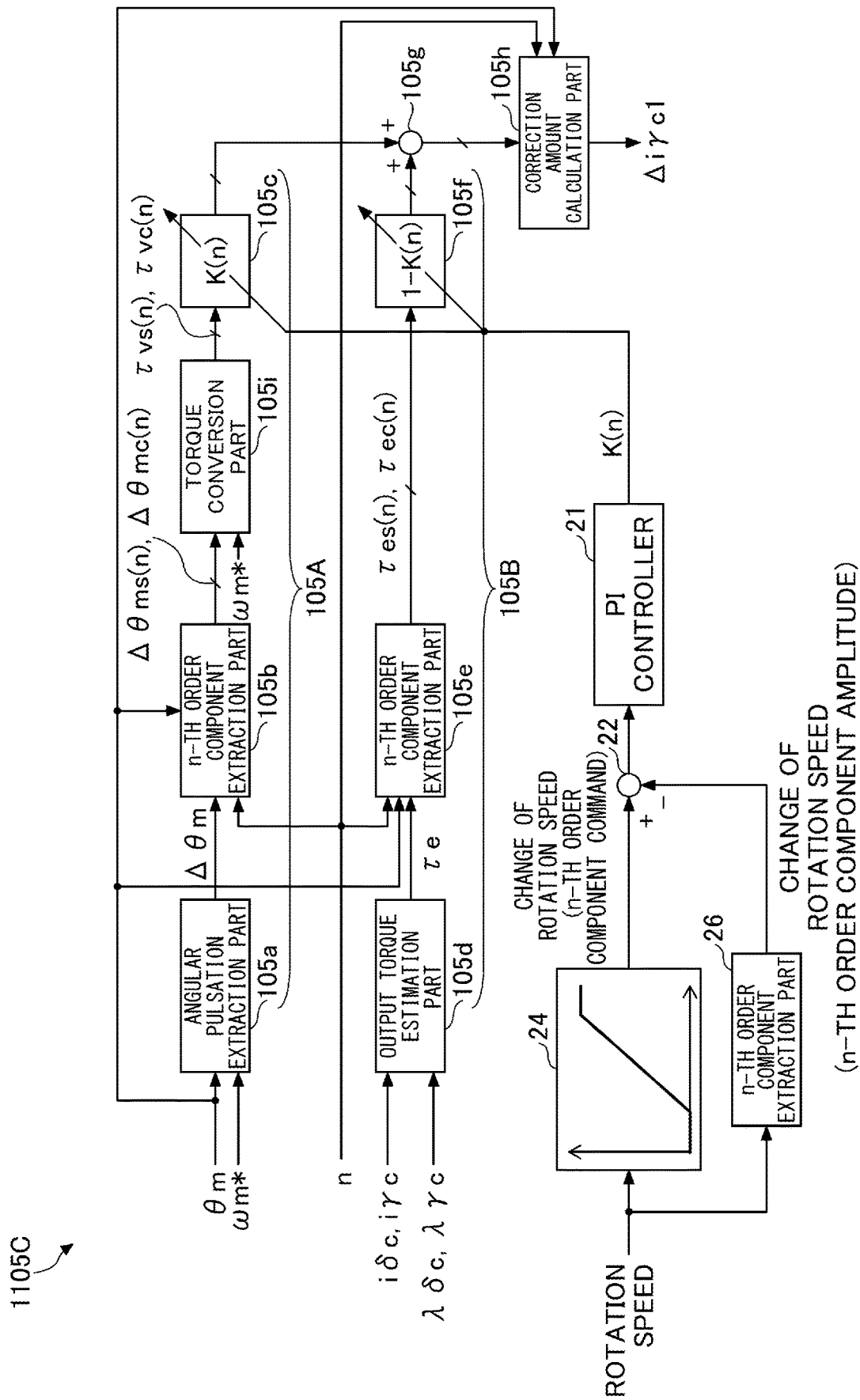
FIG. 11 is a block diagram illustrating a third example configuration of the γc-axis current correction part according to the first embodiment.

FIG. 11 is a block diagram illustrating a third example configuration of the γc-axis current correction part according to the first embodiment. The γc-axis current correction part 1105C illustrated in FIG. 11 is an example of the γc-axis current correction part 105 (see FIG. 7). The description of parts in the third example configuration (FIG. 11) that are the same as in the first example configuration (FIG. 8) will be omitted by making reference to the description given earlier herein.

The γc-axis current correction part 1105C determines the n-th order components (rotation speed variation amount command) of a command value for the magnitude of variation of the rotation speed of the synchronization motor 3 according to the detected value or the command value for the rotation speed of the synchronization motor 3. Then, the γc-axis current correction part 1105C determines the magnitude of apportionment coefficient K(n) for controlling the vibration amplitude of the compressor at a substantially constant level, according to the rotation speed variation amount command determined.

The γc-axis current correction part 1105C has a table 25, an n-th order component extraction part 26, a subtractor 22, and a PI controller 21.

In the table 25, the relationship between the rotation speed of the synchronous motor 3 and the magnitude of variation of the rotation speed is configured in advance in order to control the vibration amplitude of the compressor at a substantially constant level in a specific operating area. The table 25 is equivalent to a table representing the approximating straight line (approximating curve) illustrated in FIG. 3 described above. The table 25 is defined by a regression equation or map data representing an approximating curve. The γc-axis current correction part 1105C determines a rotation speed variation amount command for controlling the vibration amplitude of the compressor at a substantially constant level according to the detected value or the command value for the rotation speed of the synchronous motor 3, based on the table 25. This rotation speed variation amount command is an example of data read from the preconfigured table.

The n-th order component extraction part 26 extracts the n-th order components of the estimated value of the variation of rotation speed based on the detected value or the command value for the rotation speed of the synchronous motor 3. The subtractor 22 calculates the error between the n-th order components of the command value for the magnitude of variation of rotation speed and the n-th order components of the estimated value of the magnitude of variation of rotation speed. The PI controller 21 derives an apportionment coefficient K(n) that brings the error calculated by the subtractor 22 close to zero, based on PI control or the like. By deriving apportionment coefficient K(n) in this way, it is possible to reduce the vibration of the compressor and reduce the decrease of efficiency in a specific operating area, as in the above-described example configuration.

Figure 12:
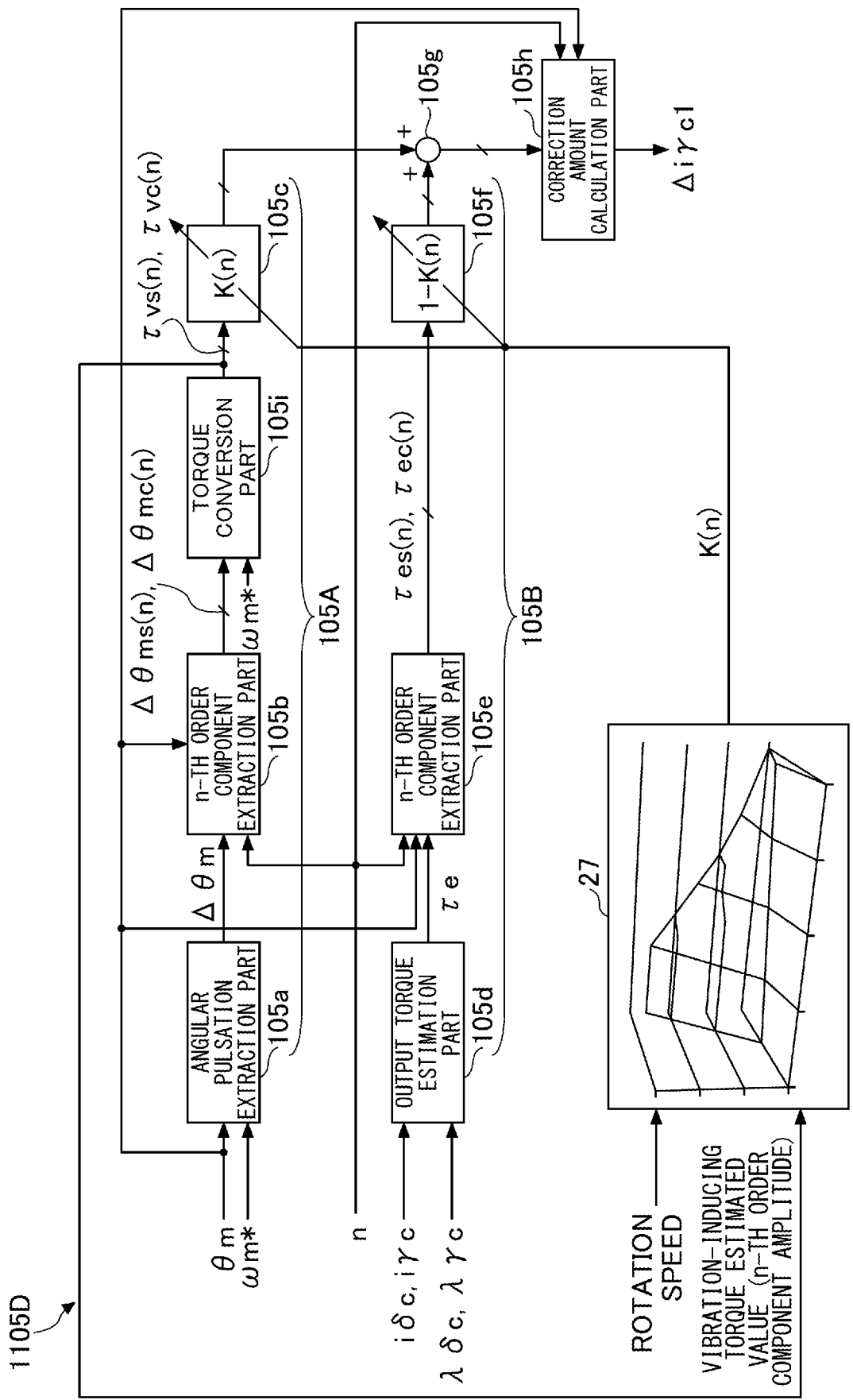
FIG. 12 is a block diagram illustrating a fourth example configuration of the γc-axis current correction part according to the first embodiment.

FIG. 12 is a block diagram illustrating a fourth example configuration of the γc-axis current correction part according to the first embodiment. The γc-axis current correction part 1105D illustrated in FIG. 12 is an example of the γc-axis current correction part 105 (see FIG. 7). The description of parts in the fourth example configuration (FIG. 12) that are the same as in the first example configuration (FIG. 8) will be omitted by making reference to the description given earlier herein.

The γc-axis current correction part 1105D determines the magnitude of apportionment coefficient K(n) to control the vibration amplitude of the compressor at a substantially constant level, according to the detected value or the command value for the rotation speed of the synchronous motor 3, based on the table 27. The γc-axis current correction part 1105D has the table 27.

In the table 27, the relationships among the rotation speed of the synchronous motor 3, vibration-inducing torque, and apportionment coefficient K(n) are configured in advance, in order to control the vibration amplitude of the compressor at a substantially constant level in a specific operating area. The table 27 is equivalent to a table obtained by introducing apportionment coefficient K(n) to a table representing the approximating straight line (approximating curve) illustrated in FIG. 3 described above. Table 27 is defined by a regression equation or map data representing an approximating curve. By controlling vibration-inducing torque according to the command value for the vibration-inducing torque corresponding to the number of revolutions per unit time, as shown in FIG. 3, the vibration amplitude can be controlled to a substantially constant level regardless of the load on the motor and the changes of the number of revolutions of the motor per unit time. Therefore, the embodiment illustrated in FIG. 12 employs a configuration in which the detected value or command value for the rotation speed of the synchronous motor 3 and the n-th order components of the estimated value of vibration-inducing torque are input to the table 27, and an operation amount is output from the table 27. In this embodiment, the operation amount is an apportionment coefficient K(n), and the motor torque is adjusted according to this apportionment coefficient K(n). Furthermore, as mentioned earlier, the vibration-inducing torque on the vertical axis of FIG. 3 can be replaced with the magnitude of variation of magnetic pole positions or the magnitude of variation of rotation speed, but in this embodiment, vibration-inducing torque, which is more preferable, is used. The γc-axis current correction part 1105D determines an apportionment coefficient K(n) to control the vibration amplitude of the compressor at a substantially constant level, according to the detected value or command value for the rotation speed of the synchronous motor 3 and the n-th order components of the estimated value of vibration-inducing torque, based on the table 27. This apportionment coefficient K(n) is an example of data read from the preconfigured table. By deriving apportionment coefficient K(n) in this way, it is possible to reduce the vibration of the compressor and reduce the decrease of efficiency in a specific operating area, as in the above-described example configuration.

In the table 27, the vibration-inducing torque may be replaced with the magnitude of variation of magnetic pole positions or the magnitude of variation of rotation speed. Even in this case, apportionment coefficient K(n) is derived by using the table 27, so that it is possible to reduce the vibration of the compressor and reduce the decrease of efficiency in a specific operating area.

Figure 13:
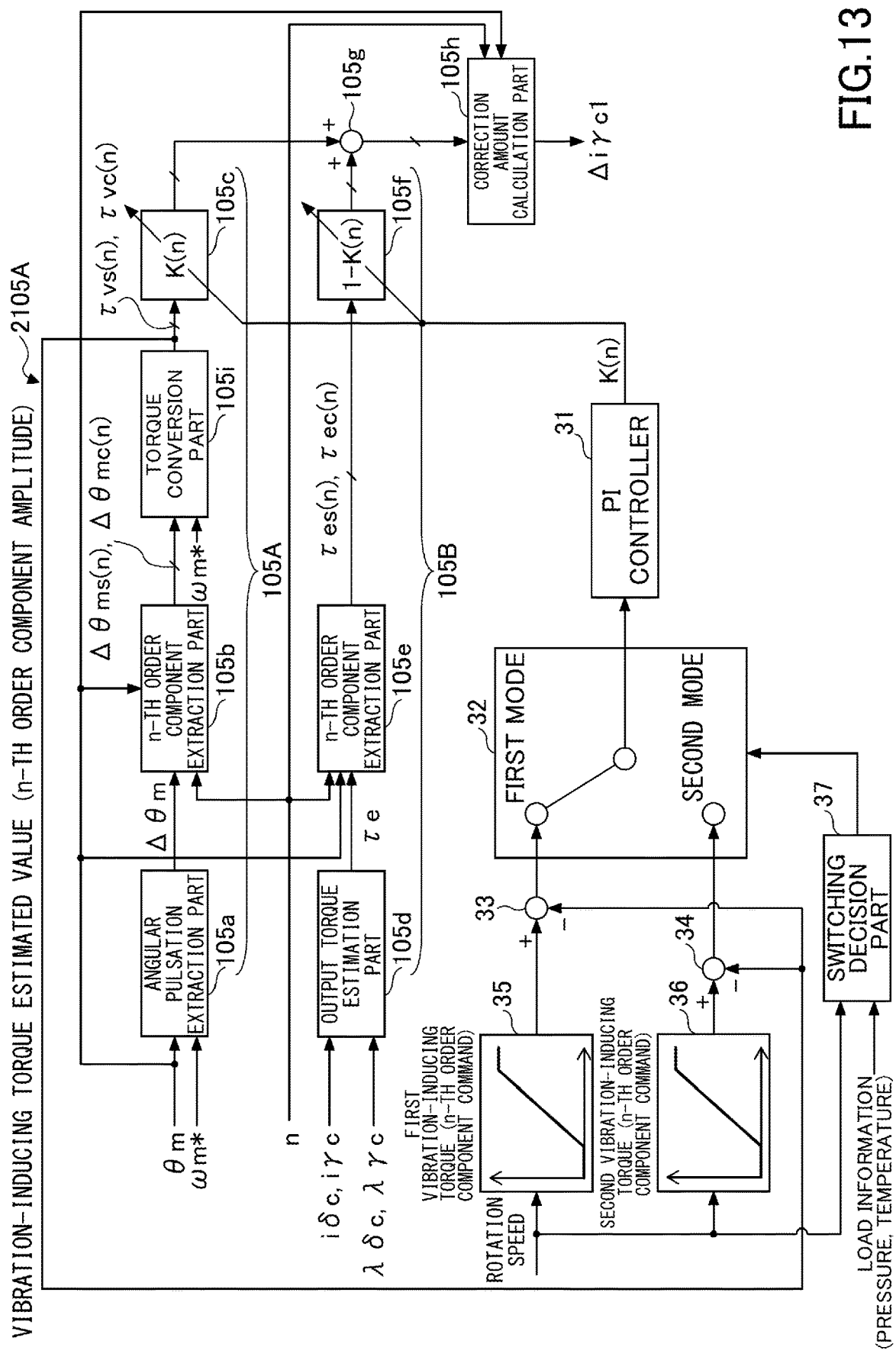
FIG. 13 is a block diagram illustrating a first example configuration of the γc-axis current correction part according to the second embodiment.

FIG. 13 is a block diagram illustrating a first example configuration of the γc-axis current correction part according to a second embodiment. The γc-axis current correction part 2105A illustrated in FIG. 13 is an example of the γc-axis current correction part 105 (see FIG. 7). The description of parts in the first example configuration (FIG. 13) of the second embodiment that are the same as in the first example configuration (FIG. 8) of the first embodiment will be omitted by making reference to the description given earlier herein.

The γc-axis current correction part 2105A determines the n-th order components (first vibration-inducing torque command) of the command value for vibration-inducing torque in the above-described first mode, according to the detected value or the command value for the rotation speed of the synchronous motor 3, based on a table 35. Similarly, the γc-axis current correction part 2105A determines the n-th order components (second vibration-inducing torque command) of the command value for vibration-inducing torque in the above-described second mode, according to the detected value or the command value for the rotation speed of the synchronous motor 3, based on a table 36.

The γc-axis current correction part 2105A has tables 35 and 36, subtractors 33 and 34, a switching part 32, a switching decision part 37, and a PI controller 31.

In the table 35, the relationship between the rotation speed of the synchronous motor 3 and vibration-inducing torque is configured in advance, in order to control the vibration amplitude of the compressor to the first level in a specific operating area in the first mode. The γc-axis current correction part 2105A determines a first vibration-inducing torque command for controlling the vibration amplitude of the compressor to the first level according to the detected value or the command value for the rotation speed of the synchronous motor 3, based on the table 35.

In the table 36, the relationship between the rotation speed of the synchronous motor 3 and vibration-inducing torque is configured in advance, in order to control the vibration amplitude of the compressor to the second level in a specific operating area in the second mode. The γc-axis current correction part 2105A determines a first vibration-inducing torque command for controlling the vibration amplitude of the compressor to the second level according to the detected value or the command value for the rotation speed of the synchronous motor 3, based on the table 36.

The subtractor 33 calculates the first error between the n-th order components of the command value for vibration-inducing torque and the n-th order components of the estimated value of vibration-inducing torque in the first mode. The subtractor 34 calculates the second error between the n-th order components of the command value for vibration-inducing torque and the n-th order components of the estimated value of vibration-inducing torque in the second mode.

The switching part 32 switches the error to be input to the PI controller 31 between the first error and the second error, depending on the result determined in the switching decision part 37. The switching decision part 37 determines to input the first error to the PI controller 31 when the load imposed on the synchronous motor 3 drops to or below the first threshold configured per number of revolutions of the synchronous motor 3 per unit time, and determines to input the second error to the PI controller 31 when the load on the synchronous motor 3 rises above the second threshold configured per number of revolutions of the synchronous motor 3 per unit time. The load imposed on the synchronous motor 3 includes, for example, pressure, temperature, and so forth. Information about load such as pressure and temperature is supplied from outside the compressor.

The PI controller 31 derives apportionment coefficient K(n) that brings the error input from the switching part 32 close to zero, based on PI control or the like. By deriving apportionment coefficient K(n) in this way, when the load imposed on the synchronous motor 3 rises above the second threshold, the vibration amplitude of the compressor is controlled to the second level, which is lower than the first level, so that the increase of the vibration amplitude of the compressor can be reduced.

In the tables 35 and 36, the vibration-inducing torque may be replaced with the magnitude of variation of magnetic pole positions or the magnitude of variation of rotation speed. Even in this case, when the load that is imposed on the synchronous motor 3 rises above the second threshold, the vibration amplitude of the compressor is controlled to the second level, which is lower than the first level, so that the increase of the vibration amplitude of the compressor can be reduced.

Figure 14:
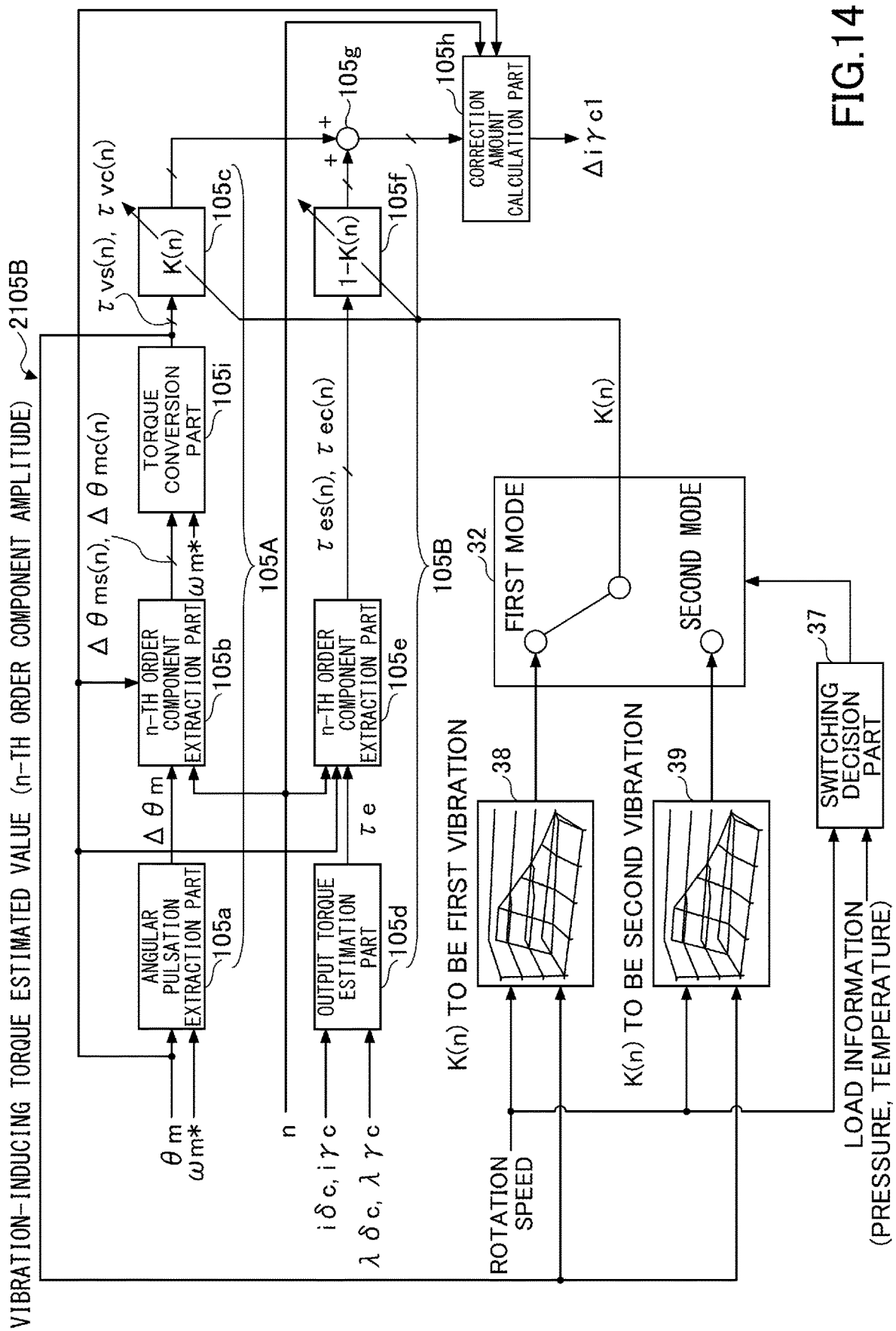
FIG. 14 is a block diagram illustrating a second example configuration of the γc-axis current correction part according to the second embodiment.

FIG. 14 is a block diagram illustrating a second example configuration of the γc-axis current correction part according to the second embodiment. The γc-axis current correction part 2105B illustrated in FIG. 14 is an example of the γc-axis current correction part 105 (see FIG. 7). The description of parts in the second example configuration (FIG. 14) of the second embodiment that are the same as in the fourth example configuration (FIG. 12) of the first embodiment and the first example configuration of the second embodiment (FIG. 13) will be omitted by making reference to the description given earlier herein.

In the γc-axis current correction part 2105B, the magnitude of apportionment coefficient K(n) for controlling the vibration amplitude of the compressor to the first level according to the detected value or the command value for the rotation speed of the synchronous motor 3 is determined based on the table 38. Similarly, in the γc-axis current correction part 2105B, the magnitude of apportionment coefficient K(n) for controlling the vibration amplitude of the compressor to the second level according to the detected value or the command value for the rotation speed of the synchronous motor 3 is determined based on the table 39. The γc-axis current correction part 1105D has tables 38 and 39.

In table 38, the relationships among the rotation speed of the synchronous motor 3, the vibration-inducing torque, and apportionment coefficient K(n) are configured in advance in order to control the vibration amplitude of the compressor to the first level. The γc-axis current correction part 2105A determines apportionment coefficient K(n) for controlling the vibration amplitude of the compressor to the first level, according to the detected value or the command value for the rotation speed of the synchronous motor 3 and the n-th order components of the estimated value of vibration-inducing torque, based on the table 38. In the table 39, the relationships among the rotation speed of the synchronous motor 3, the vibration-inducing torque, and apportionment coefficient K(n) are configured in advance in order to control the vibration amplitude of the compressor to the second level. The γc-axis current correction part 2105A determines apportionment coefficient K(n) for controlling the vibration amplitude of the compressor to the second level, according to the detected value or the command value for the rotation speed of the synchronous motor 3 and the n-th order components of the estimated value of vibration-inducing torque, based on the table 39.

The switching part 32 switches apportionment coefficient K(n) to a coefficient for controlling the vibration amplitude of the compressor to the first level or a coefficient for controlling the vibration amplitude of the compressor to the second level, according to the result determined by the switching decision part 37. When the load that is imposed on the synchronous motor 3 drops to or below the first threshold, which is configured per number of revolutions of the synchronous motor 3 per unit time, the switching decision part 37 selects apportionment coefficient K(n) for controlling the vibration amplitude of the compressor to the first level. When the load that is imposed on the motor 3 rises above the second threshold, which is configured per number of revolutions of the synchronous motor 3 per unit time, the switching decision part 37 selects apportionment coefficient K(n) for controlling the vibration amplitude of the compressor to the second level. By deriving apportionment coefficient K(n) in this way, when the load imposed on the synchronous motor 3 rises above the second threshold, the vibration amplitude of the compressor is controlled to the second level, which is lower than the first level, so that the increase of the vibration amplitude of the compressor can be reduced.

Note that, in the tables 38 and 39, the vibration-inducing torque may be replaced with the magnitude of variation of magnetic pole positions or the magnitude of variation of rotation speed. Even in this case, when the load imposed on the synchronous motor 3 rises above the second threshold, the vibration amplitude of the compressor is controlled to the second level, which is lower than the first level, so that the increase of the vibration amplitude of the compressor can be reduced.

Figure 15:
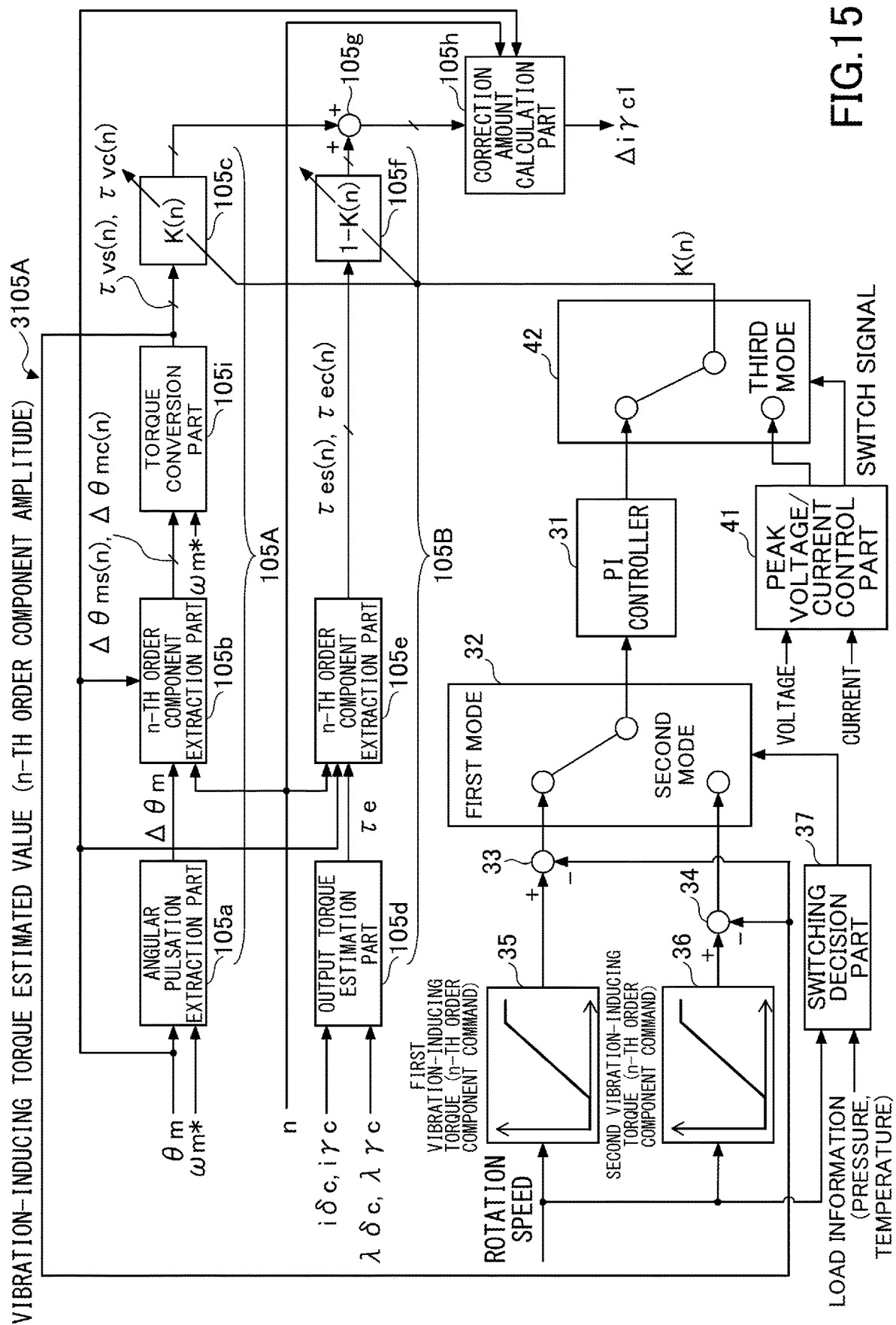
FIG. 15 is a block diagram illustrating a first example configuration of the γc-axis current correction part according to the third embodiment.

FIG. 15 is a block diagram illustrating a first example configuration of the γc-axis current correction part according to a third embodiment. The γc-axis current correction part 3105A illustrated in FIG. 15 is an example of the γc-axis current correction part 105 (see FIG. 7). The description of parts in the first example configuration (FIG. 15) of the third embodiment that are the same as in the first example configuration (FIG. 8) of the first embodiment and the first example configuration of the second embodiment (FIG. 13) will be omitted by making reference to the description given earlier herein.

The γc-axis current correction part 3105A has a control part 41 that determines apportionment coefficient K(n) in the above-mentioned third mode, according to the voltage value applied to the synchronous motor 3 and the current value flowing in the synchronous motor 3.

The control part 41 controls the voltage or current supplied from an inverter in the voltage supply source 2 to the synchronous motor 3, so as to reduce the vibration amplitude of the compressor to the first level or lower. For example, when it is detected that the vibration amplitude of the compressor cannot be maintained at the second level for more than a predetermined period of time in the second mode, the control part 41 generates an apportionment coefficient K(n) for reducing the vibration amplitude of the compressor to the first level or lower, and switches the operation mode of the compressor from the second mode to the third mode by means of the switching part 42. The control part 41 adjusts apportionment coefficient K(n) so that the voltage or current supplied to the synchronous motor 3 is limited to a predetermined value to reduce the vibration amplitude of the compressor to the first level or lower.

By deriving apportionment coefficient K(n) in this way, even if the vibration amplitude of the compressor cannot be controlled to the second level for some reason, the vibration amplitude of the compressor is still controlled between the first level and the second level, so that the vibration of the compressor can be reduced.

Figure 16:
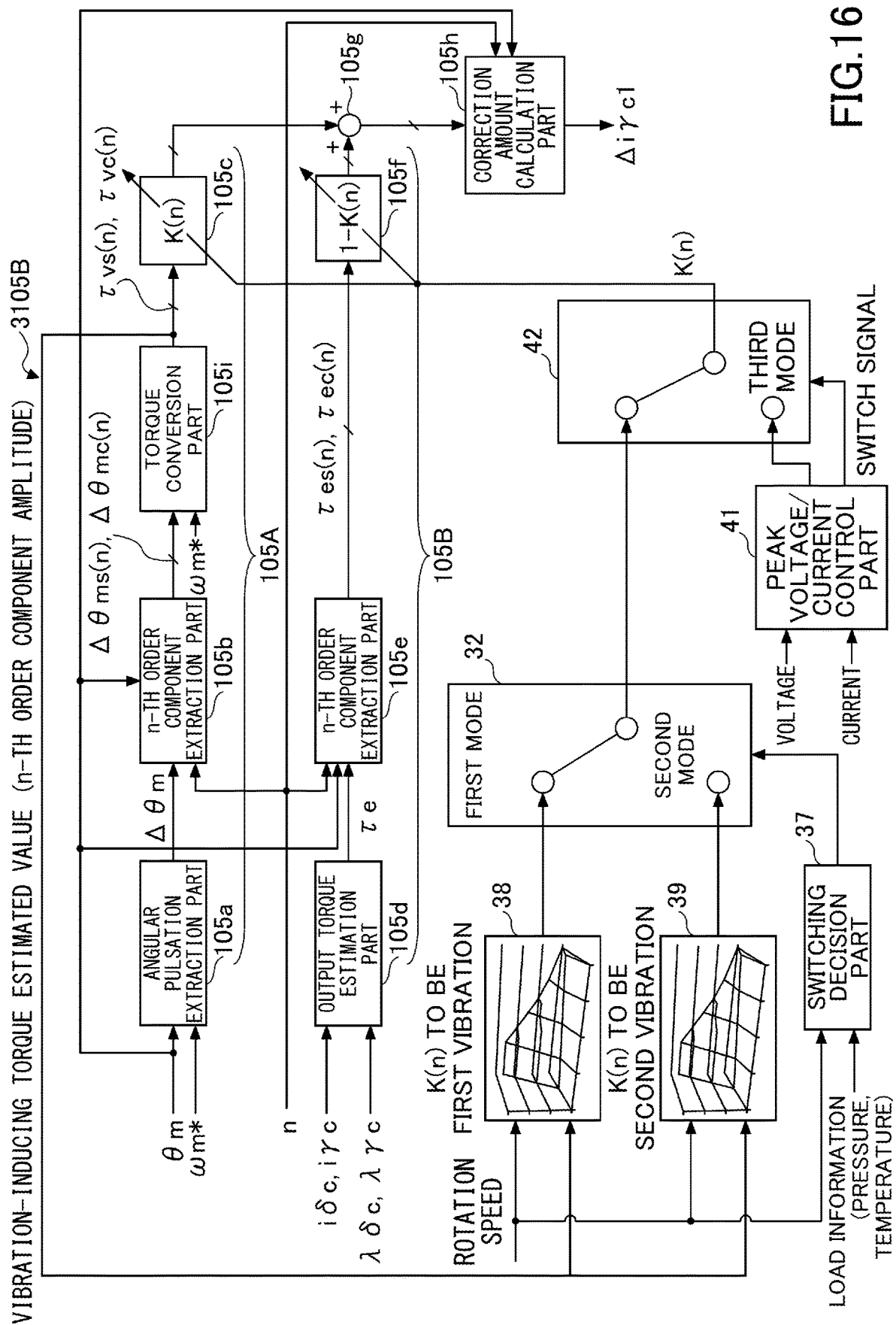
FIG. 16 is a block diagram illustrating a second example configuration of the γc-axis current correction part according to the third embodiment.

FIG. 16 is a block diagram illustrating a second example configuration of the γc-axis current correction part according to a third embodiment. The γc-axis current correction part 3105B illustrated in FIG. 16 is an example of the γc-axis current correction part 105 (see FIG. 7). The description of parts in the second example configuration (FIG. 16) of the third embodiment that are the same as in the first example configuration (FIG. 8) of the first embodiment and the first example configuration of the third embodiment (FIG. 15) will be omitted by making reference to the description given earlier herein. The configuration of FIG. 16 is obtained by replacing the tables 35 and 36 of FIG. 15 with the tables 38 and 39 of FIG. 14. In the configuration of FIG. 16, as in FIG. 15, the vibration amplitude of the compressor is controlled between the first level and the second level even when the vibration amplitude of the compressor cannot be controlled to the second level for some reason, so that the vibration of the compressor can be reduced.

As described above, according to the 1C compressor control method of the present disclosure, in a specific operating area, the vibration amplitude of the compressor is controlled to be substantially constant regardless of the load on the motor and the changes of the number of revolutions of the motor per unit time, so that the vibration of the compressor can be reduced.

Conventionally, there are arts (Japanese Patent No. 3874865 and Japanese Patent No. 4596906) that limit the variation of speed to a constant value or to 2% to 50% for the purpose of reducing vibration and reducing the decrease of efficiency. In either case, however, controlling the variation of speed to a constant value might result in excessive vibration reduction control, which might then result in a decrease in efficiency. In addition, there is an art (Japanese Patent No. 6364463) to change the above limit according to both the number of revolutions per unit time and the magnitude of load. However, when the range to limit the variation of speed is changed not only based on the number of revolutions per unit time but also based on the magnitude of load, the compressor's vibration amplitude cannot be controlled to a substantially constant level, which may also reduce efficiency. The present disclosure is characterized in controlling the amplitude of vibration, not the variation of speed, to be substantially constant, so that the vibration-inducing torque corresponding to the number of revolutions per unit time for controlling the vibration amplitude to a certain level can be easily tuned linearly, and both vibration reduction and efficiency improvement can be realized without applying excessive vibration reduction control.

Although embodiments of the present disclosure have been described above, it should be understood that various changes in form and details are possible without departing from the purpose and scope of the present disclosure as set forth in the claims. Various modifications and improvements such as combination and replacement with a part or all of other embodiments are possible.

This international application claims priority based on Japanese Patent Application No. 2019-238422, filed Dec. 27, 2019, and the entire contents of Japanese Patent Application No. 2019-238422 are incorporated herein by reference.

DESCRIPTION OF REFERENCE SYMBOLS 1 motor control device
3 synchronous motor
12 speed command correction device
1105A-1105D, 2105A, 2105B, 3105A, 2105B γc-axis current correction part

The invention claimed is:

1. A compressor control method of controlling a vibration amplitude of a compressor equipped with a motor by using the motor, the compressor being driven by the motor, the method comprising
controlling, in a specific operating area, the vibration amplitude such that the vibration amplitude is substantially constant regardless of changes in a load imposed on the motor and in a number of revolutions of the motor per unit time, wherein the controlling of the vibration amplitude in the specific operating area is performed by:
controlling the vibration amplitude such that the vibration amplitude is set to a first level when the load imposed on the motor drops to or below a first threshold that is set for every number of revolutions of the motor per unit time; and
controlling the vibration amplitude such that the vibration amplitude is set to a second level when the load imposed on the motor rises above a second threshold that is set for every number of revolutions of the motor per unit time,
wherein the first threshold is lower than or equal to the second threshold, and
wherein the second level is lower than the first level.

2. The compressor control method according to claim 1, comprising controlling the vibration amplitude based on data read from a preconfigured table such that the vibration amplitude is substantially constant regardless of the changes.

3. The compressor control method according to claim 1, comprising a mode in which the vibration amplitude is controlled between the first level and the second level.

4. The compressor control method according to claim 1, comprising controlling the vibration amplitude such that the vibration amplitude is set to be substantially constant based on a variable that increases or decreases according to the vibration amplitude, regardless of the changes.

5. The compressor control method according to claim 4, wherein the variable is one of
a vibration-inducing torque, generated by a difference between a load torque that is imposed on the motor and a motor torque that is generated by the motor,
a magnitude of variation of magnetic pole positions of the motor, and
a magnitude of variation of a rotation speed of the motor, and
wherein the magnitude of the vibration-inducing torque, the magnitude of variation of magnetic pole positions, or the magnitude of variation of rotation speed changes according to the number of revolutions of the motor per unit time.

* * * * *